US012787901B2

(12) United States Patent
Gray et al.

(10) Patent No.: US 12,787,901 B2
(45) Date of Patent: Nov. 10, 2026

(54) VARIABLE TILLAGE IMPLEMENT

(71) Applicant: Salford Group Inc., Salford (CA)

(72) Inventors: Geof J. Gray, Burford (CA); Jacobus A. Rozendaal, Delhi (CA); John Mark Averink, Norwich (CA); Mikhail Rodionov, North York (CA); Bradley William Baker, Stratford (CA); Frens Hoeve, Tillsonburg (CA); Chad Derek Pasma, Beachville (CA); Christopher Michael Poppe, Mitchell (CA); Frederick Kristoffer Gordon Wright, St. Thomas (CA); Magnus Claussen, London (CA)

( * ) Notice: Subject to any disclaimer, the term of this patent is extended or adjusted under 35 U.S.C. 154(b) by 998 days.

(21) Appl. No.: 17/778,174

(22) PCT Filed: Nov. 27, 2020

(86) PCT No.: PCT/CA2020/051633
§ 371 (c)(1),
(2) Date: May 19, 2022

(87) PCT Pub. No.: WO2021/108898
PCT Pub. Date: Jun. 10, 2021

(65) Prior Publication Data

US 2022/0408625 A1 Dec. 29, 2022

Related U.S. Application Data

(60) Provisional application No. 62/943,863, filed on Dec. 5, 2019.

(51) Int. Cl.
*A01B 33/02* (2006.01)
*A01B 33/12* (2006.01)
(Continued)

(52) U.S. Cl.
CPC ............ *A01B 33/024* (2013.01); *A01B 33/12* (2013.01); *A01B 63/004* (2013.01); *A01B 73/04* (2013.01); *A01B 73/06* (2013.01)

(58) Field of Classification Search
CPC ....... A01B 33/024; A01B 33/12; A01B 73/02; A01B 73/06; A01B 63/004
See application file for complete search history.

(56) References Cited

U.S. PATENT DOCUMENTS 1,919,080 A * 7/1933 Stewart ................ A01B 23/046 172/597
2,648,184 A * 8/1953 Cruse .................. A01B 21/086 172/583
(Continued)

FOREIGN PATENT DOCUMENTS

CA 2883425 A1 8/2016

OTHER PUBLICATIONS

International Search Report and Written Opinion dated Feb. 11, 2021 on PCT application PCT/CA2020/051633 filed Nov. 27, 2020.
(Continued)

*Primary Examiner* — Christopher J Sebesta
*Assistant Examiner* — Audrey L Lusk
(74) *Attorney, Agent, or Firm* — Brunet & Co. Ltd.; Robert Brunet

(57) ABSTRACT

A tillage implement for variable tillage has a linkage mechanism disposed longitudinally between two gangs of annular harrow tools, the gangs each having a toolbar that is rotationally mounted on a frame of the implement. The linkage mechanism has a plurality of pivotally connected linkage arms, the toolbars each pivotally connected to at least one of the linkage arms. Operation of the linkage mechanism simultaneously rotates one toolbar about a first vertical rotation axis and the other toolbar about a second vertical
(Continued)

rotation axis in an opposite rotational direction as the first toolbar. The implement has at least one wheel mounted on the frame longitudinally forward of both of the gangs or longitudinally rearward of both of the gangs. The tillage implement provides variable tillage while having a shorter frame to facilitate folding wing sections of the frame in a more compact manner for transportation while remaining assembled.

19 Claims, 22 Drawing Sheets

(51) Int. Cl.

| | |
|---|---|
| ***A01B 63/00*** | (2006.01) |
| ***A01B 73/04*** | (2006.01) |
| ***A01B 73/06*** | (2006.01) |

(56) References Cited

U.S. PATENT DOCUMENTS

| | | | | | |
|---|---|---|---|---|---|
| 2,679,791 | A * | 6/1954 | Carney | A01B 5/16 | 172/574 |
| 3,132,700 | A * | 5/1964 | Van Sickle | A01B 63/22 | 172/414 |
| 3,439,750 | A * | 4/1969 | Mckay | A01B 21/08 | 172/581 |
| 3,460,630 | A * | 8/1969 | Richey | A01B 21/08 | 172/581 |
| 3,545,033 | A * | 12/1970 | Couser | A01B 59/06 | 16/370 |
| 3,643,743 | A * | 2/1972 | Fueslein | A01B 21/08 | 172/600 |
| 3,757,871 | A * | 9/1973 | Maust, Jr. | D06P 1/655 | 172/640 |
| 3,797,580 | A * | 3/1974 | Roth | A01B 73/04 | 172/311 |
| 4,034,623 | A * | 7/1977 | Boone | A01B 73/065 | 172/240 |
| 4,056,149 | A * | 11/1977 | Honnold | A01B 73/067 | 172/311 |
| 4,061,195 | A * | 12/1977 | Pryor | A01B 73/044 | 172/456 |
| 4,066,274 | A * | 1/1978 | Adee | A01B 73/062 | 172/581 |
| 4,180,135 | A | 12/1979 | Birkenbach et al. | | |
| 4,328,869 | A * | 5/1982 | Perelli | A01B 73/044 | 172/619 |
| 4,423,789 | A * | 1/1984 | Anderson | A01B 21/08 | 172/585 |
| 4,479,554 | A * | 10/1984 | Kueker | A01B 73/044 | 74/105 |
| 4,986,367 | A * | 1/1991 | Kinzenbaw | A01B 73/046 | 172/126 |
| 5,915,481 | A | 6/1999 | Flenker et al. | | |
| 6,935,435 | B1 * | 8/2005 | Shenk | A01B 39/14 | 172/600 |
| 8,534,374 | B2 * | 9/2013 | Hake | A01B 63/002 | 172/600 |
| 9,668,399 | B2 | 6/2017 | Gates | | |
| 2008/0110649 | A1 | 5/2008 | Connell et al. | | |
| 2008/0230243 | A1 * | 9/2008 | Evin | A01B 21/086 | 172/569 |
| 2008/0250767 | A1 * | 10/2008 | Boyko | A01B 73/044 | 56/14.7 |
| 2009/0114406 | A1 * | 5/2009 | Read | A01B 73/067 | 172/260.5 |
| 2011/0284253 | A1 * | 11/2011 | Stevenson | A01B 49/027 | 172/311 |
| 2014/0262370 | A1 * | 9/2014 | Kohn | A01B 63/24 | 172/140 |
| 2015/0163988 | A1 * | 6/2015 | Swanson | A01B 21/086 | 172/569 |
| 2016/0212928 | A1 | 7/2016 | Wileniec et al. | | |
| 2016/0262300 | A1 * | 9/2016 | Gates | A01B 63/004 | |
| 2017/0079189 | A1 | 3/2017 | Steinlage et al. | | |

OTHER PUBLICATIONS

Gates Manufacturing Coulter Disk 9000 Series on-line brochure dated Nov. 4, 2019 and Operator's Manual dated Jun. 2014.
Mandako Storm Tillage implement on-line brochure dated Nov. 4, 2019.
Summers VRT Renegade tillage implement on-line brochure dated Nov. 4, 2019.
Office action dated Nov. 29, 2022 on Eurasian application 202291495.
Extended European search report dated Dec. 4, 2023 on European application 20895804.1.
Office action dated May 22, 2025 on Ukrainian application 2022 02183.
Office action dated Jun. 2, 2025 on Australian application 2020396059.
Office action dated Jun. 24, 2025 on Brazil application 112022010939-3.

* cited by examiner

VARIABLE TILLAGE IMPLEMENT

CROSS-REFERENCE TO RELATED APPLICATIONS

This application is a national entry of PCT/CA2020/051633 filed Nov. 27, 2020, which claims the benefit of U.S. Provisional Patent Application Ser. No. 62/943,863 filed Dec. 5, 2019, the entire contents of both of which are herein incorporated by reference.

FIELD

This application relates to agriculture, in particular to a tillage implement for performing variable tillage.

BACKGROUND

Tillage implements for tilling soil in a field typically comprise a frame with one or more tillage tools of one or more types mounted on the frame in a position and orientation in which the tillage tools can engage the field in order to till the soil. The frames are often large to provide room for mounting a plurality of tillage tools in the same transverse row on the frame to provide a broader tilling swath. In many cases, the plurality of tillage tools in a transverse row are mounted in a gang on a common toolbar, the tool bar being mounted on the frame to facilitate mounting and exchanging large numbers of tillage tools in a shorter period of time so that the same frame can be used for different tillage operations. The frame also typically comprises a plurality of transverse rows of tillage tools longitudinally spaced-apart on the frame to provide greater intensity of tillage so that multiple passes with the implement over the same locations on the field are not required. The angles of engagement of the tillage tools with the field are usually set prior to tilling when the tillage tools are mounted on the frame, and cannot be readily changed in response to different field conditions during a tillage operation.

Further, multiple frame sections transversely set apart from each other may be utilized to increase the width of the frame. Utilizing multiple frame sections provides the opportunity to include an arrangement for folding frame sections into a storage position when the tillage implement is not in use to facilitate storage of the implement in a machine shop or yard. While the ability to fold frame sections into a vertical position facilitates storage of the implement and permits a limited ability to transport the implement along a roadway over short distances, vertically folded frame sections still impose difficulties in transporting fully assembled implements over long distances on roadways, particularly on roadways which pass under bridges and the like that have maximum height limitations. To overcome the maximum height limitations, manufacturers generally ship tillage implements in a disassembled state where outer frame sections are disconnected from the rest of the frame. Consequently, when the implement arrives at a customer, the implement must be assembled, which can be laborious and difficult for the customer.

A number of tillage implements have been developed that provide the ability to rotate a gang of tillage tools through an angle of 0° to 15°, with respect to a transverse axis of the frame, to provide less or more aggressive angles of engagement of the tillage tools with the field. However, such implements suffer from large longitudinal spacing requirements between longitudinally adjacent gangs of tillage tools, thereby requiring longer frames, which is undesirable when the frame has frame sections which are folded up for transport on a roadway. Such implements are required to be shipped in the disassembled state, and then reassembled by the customer.

There remains a need for a tillage implement having variable tillage capability and a shorter frame that is compact enough while remaining assembled for convenient roadway transportation when outer transverse sections (i.e. wing sections) of the frame are folded for storage and transportation.

SUMMARY

A tillage implement is provided comprising: a frame connectable to a towing vehicle, the frame comprising a plurality of elongated transverse frame elements and a plurality of elongated longitudinal frame elements connected to the plurality of elongated transverse frame elements, the frame having a horizontal longitudinal axis parallel to a direction of travel of the tillage implement and a horizontal transverse axis perpendicular to the horizontal longitudinal axis when the tillage implement is in a deployed configuration to till a field; a first gang comprising a first toolbar and a first plurality of annular harrow tools mounted on the first toolbar, the first toolbar having a first vertical toolbar plane through a length of the first toolbar, each annular harrow tool of the first plurality of annular harrow tools having a first rotating circumferential cutting edge whereby a first vertical harrow tool plane passes through two diametrically opposed points on the first circumferential cutting edge, the first toolbar pivotally mounted on the frame to be rotatable about a first vertical rotation axis; a second gang comprising a second toolbar and a second plurality of annular harrow tools mounted on the second toolbar, the second toolbar having a second vertical toolbar plane through a length of the second toolbar, each annular harrow tool of the second plurality of annular harrow tools having a second rotating circumferential cutting edge whereby a second vertical harrow tool plane passes through two diametrically opposed points on the second circumferential cutting edge, the second toolbar pivotally mounted on the frame to be rotatable about a second vertical rotation axis; a linkage mechanism disposed longitudinally between the first and second toolbars, the linkage mechanism comprising a plurality of pivotally connected linkage arms, the first and second toolbars each pivotally connected to the linkage mechanism, operation of the linkage mechanism simultaneously rotating the first toolbar about the first vertical rotation axis and rotating the second toolbar about the second vertical rotation axis in an opposite rotational direction as the first toolbar; and, at least one wheel for supporting the frame on the field, the at least one wheel mounted on the frame longitudinally forward of both the first and second gang or longitudinally rearward of both the first and second gang.

There is also provided a tillage implement comprising: a frame connectable to a towing vehicle, the frame comprising a plurality of elongated transverse frame elements and a plurality of elongated longitudinal frame elements connected to the plurality of elongated transverse frame elements, the frame having a horizontal longitudinal axis parallel to a direction of travel of the tillage implement and a horizontal transverse axis perpendicular to the horizontal longitudinal axis when the tillage implement is in a deployed configuration to till a field; and, a gang comprising a toolbar and a plurality of compound angle annular harrow tools mounted on the toolbar, the toolbar pivotally mounted on the frame to be rotatable about a vertical rotation axis, each annular harrow tool of the plurality of annular harrow tools having a rotating circumferential cutting edge whereby a vertical harrow tool plane through two diametrically opposed points on the circumferential cutting edge is non-parallel to the longitudinal axis and a plane formed by a circumference of the annular harrow tool is non-parallel to the vertical harrow tool plane.

Variable tillage involves changing a position of a tillage tool between an aggressive tillage position where the soil is tilled to a greater extent and a non-aggressive tillage position where the soil is tilled to a lesser extent. Depending on soil conditions, aggressive or non-aggressive tillage may be required. Because soil conditions are not the same throughout a field, it is useful to be able to change the aggressiveness of the tillage tool on the fly. Where the tillage tool comprises an annular harrow tool (e.g. disc harrows, coulter blades, rotary aeration tines and the like), an aggressive tillage position involves angling the annular harrow so that a cutting edge of the annular harrow tool is less parallel to a direction of travel of the tillage implement, while a non-aggressive tillage position involves angling the annular harrow tool so that the cutting edge of the annular harrow tool is more parallel, preferably parallel, to a direction of travel of the tillage implement. Therefore, a tillage implement on which the angle of the annular harrow tool can be changed on the fly is useful to provide a variable tillage capability.

Longitudinally adjacent gangs of tillage tools mounted on frame sections of tillage implements of the prior art are longitudinally separated by a sufficient distance to provide maximum soil flow through the implement when the tillage tools are in the most aggressive tillage position in order to reduce plugging. However, due to constraints on the design of the prior art tillage implements, the longitudinally adjacent gangs of tillage tools are longitudinally separated by a distance larger than is required to obtain maximum soil flow through the implement when the tillage tools are in the most aggressive tillage. Thus, the frames of the prior art implements are long, leading to an inability to transport the implement along a roadway with the frame sections fully assembled on the implement.

In the present invention, longitudinally adjacent gangs of tillage tools are longitudinally spaced at a minimum distance to obtain maximum soil flow through the implement when the tillage tools are in the most aggressive tillage position in order to reduce plugging. Further, when the longitudinally adjacent gangs of tillage tools are rotated so that the tillage tools are in the least aggressive tillage position, the relative transverse position of the point at which the leading cutting edge of each of the tillage tools contacts the field shifts to provide an equidistant or nearly equidistant transverse spacing between the cutting edges of the tillage tools on the first gang in relation to the cutting edges of the tillage tools on the second gang.

In some embodiments, the tillage implement further comprises an actuator connected to at least one of the linkage arms of the linkage mechanism. The actuator may be mounted on the frame. Operation of the actuator operates the linkage mechanism. Operation of the linkage mechanism rotates the first and second toolbars about respective vertical rotation axes. The actuator may be controlled from the towing vehicle towing the implement, or from any other suitable location, for example remotely from an office. Any suitable actuator may be used, for example a hydraulic cylinder, a linear actuator, a pneumatic actuator, a mechanical actuator (e.g. a lever) or the like.

In some embodiments, the first gang comprises a first gang assembly comprising the first toolbar, a first support bar opposed to the first toolbar and at least two first support brackets rigidly connecting the first toolbar to the first support bar. In some embodiments, the second gang comprises a second gang assembly comprising the second toolbar, a second support bar opposed to the second toolbar and at least two second support brackets rigidly connecting the second toolbar to the second support bar. The plurality of linkage arms may comprise a transversely oriented common control rod pivotally connected to the first and second gangs, for example through at least two connecting arms pivotally mounted on the control rod. In some embodiments, the actuator is pivotally connected to the control rod whereby actuation of the actuator causes the first and second toolbars to rotate in opposite rotational directions about the first and second vertical rotation axes, respectively.

In some embodiments, the actuator is pivotally attached to the first support bar and the control rod at a common location. The at least two connecting arms may comprise one connecting arm pivotally connected to the control rod and the second support bar. The first and second gang assemblies may each comprise at least two gang assembly linkage arms. The gang assembly linkage arms may be pivotally connected to the first support bar and at least one of the transverse frame elements.

In some embodiments, the at least two connecting arms comprises two connecting arms. One of the connecting arms may be pivotally connected to the control rod and the first support bar. One of the connecting arms may be pivotally connected to the control rod and the second support bar. The two connecting arms pivotally may be connected to the control rod at a common location. In some embodiments, the first and second support bars are each rotatably connected to the transverse frame elements at first and second pivot points, respectively, through which the first and second vertical rotation axes pass, respectively.

In some embodiments, the plurality of linkage arms comprises a bell crank control linkage.

In some embodiments, the first and second pluralities of annular harrow tools are in a least aggressive tillage position when the first and second vertical harrow tool planes are parallel to the longitudinal axis. Further, the first vertical harrow tool planes are parallel to and transversely offset equidistantly or nearly equidistantly from adjacent second vertical harrow tool planes when the first and second pluralities of annular harrow tools are in the least aggressive tillage position. Relative transverse positions of points at which the rotating circumferential cutting edges of the first and second pluralities of annular harrow tools first contact the field shift transversely to provide the equidistant or nearly equidistant transverse offset when the first and second gangs are rotated so that the first and second pluralities of annular harrow tools are in the least aggressive tillage position.

In some embodiments, each of the first and second gangs are rotatable through an angle of 16°. When the first and second gangs each form an angle of 0° with respect to the horizontal transverse axis, the first vertical harrow tool plane forms an angle in a range of from 0° to 16°, preferably from 8° to 16°, with respect to the horizontal longitudinal axis and the second vertical harrow tool plane forms an angle in a range of from 0° to −16°, preferably from −8° to −16°, with respect to the horizontal longitudinal axis. In some embodiments, the first vertical harrow tool plane forms an angle in a range of from 0° to 16°, preferably from 8° to 16°, with respect to a first line normal to the first vertical toolbar plane;

and, the second vertical harrow tool plane forms an angle in a range of from 0° to 16°, preferably from 8° to 16° with respect to a second line normal to the second vertical toolbar plane.

In some embodiments, the at least one wheel comprises a plurality of wheels, for example two, three, four, five or more wheels. In some embodiments, the at least one wheel is mounted longitudinally forward of both the first and second gang. Positioning the at least one wheel longitudinally forward or rearward of both the first and second gang helps shorten the frame, provides space for the linkage mechanism and permits the linkage mechanism to operate to rotate both the first and second toolbars simultaneously.

In some embodiments, the frame comprises at least one wing section on which the first and second gangs are mounted and a wing support. The wing section may be pivotally mounted on the wing support and the wing support pivotally mounted on the frame such that the wing section and the wing support are pivotable between the deployed configuration where the wing section is horizontally oriented and the first and second gangs are oriented transversely to the longitudinal axis and a stowed position where the wing section is vertically oriented and the first and second gangs are oriented parallel to the longitudinal axis. The at least one wing section may comprise one, two, three, four or more wing sections. In one embodiment, the at least one wing section comprises a first wing section pivotally mounted on a first side of the wing support and a second wing section substantially identical to the first wing section, the second wing section pivotally mounted on the wing support on a second side transversely opposite the first side.

In some embodiments, the wing support may be a center section of the frame, which can also support various tillage tools, for example a further plurality of annular harrow tools. The further plurality of annular harrow tools may be mounted as center gangs on the center section. The center gangs on the center section may also be rotatable using a linkage mechanism such as the type of linkage mechanism used to rotate the first and second gangs on the at least one wing section.

In some embodiments, the at least one wing section comprises further gangs substantially identical to and transversely spaced-apart from the first and second gangs. The first and second and further gangs may be controlled by the same linkage mechanism, the linkage mechanism also disposed longitudinally between pairs of the further gangs. For example, the at least one wing section may further comprise a third gang and a fourth gang substantially identical to the first gang and the second gang, respectively, and transversely spaced-apart from the first and second gangs, the third and fourth gangs connected to the linkage mechanism, the linkage mechanism disposed longitudinally between the third and fourth gangs. Similarly, where a center section is present, the center section may comprise further center gangs.

The tillage implement has variable tillage capability and a shorter frame that is compact enough while remaining assembled for convenient roadway transportation when outer transverse sections (i.e. wing sections) of the frame are folded for storage and transportation.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
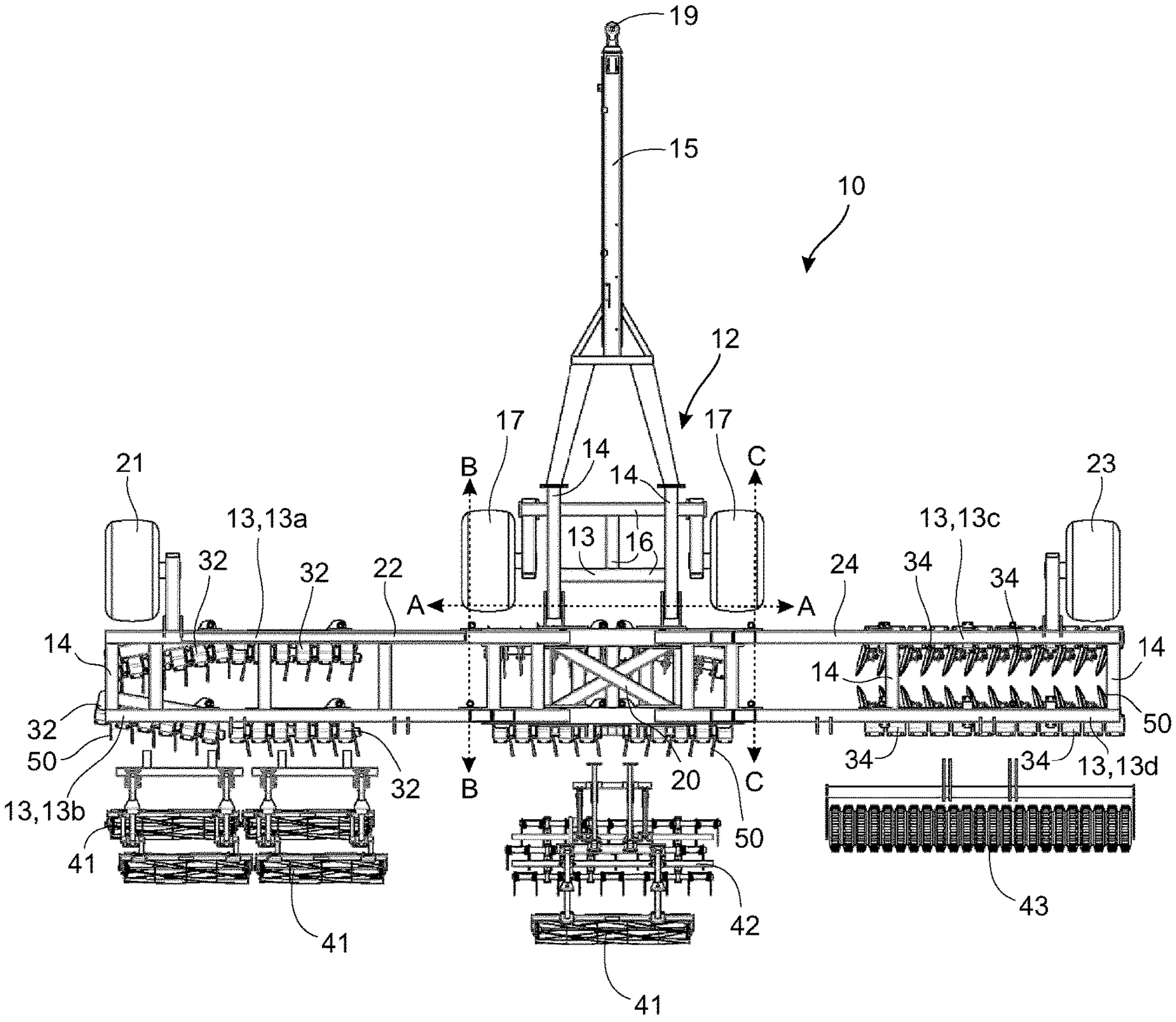
FIG. 1 depicts a top view of a three-piece tillage implement in a deployed configuration to till a field, the tillage implement comprising a frame having a center section, a first wing section pivotally mounted on a left side of the center section and a second wing section pivotally mounted on a right side of the center section.
Figure 2A:
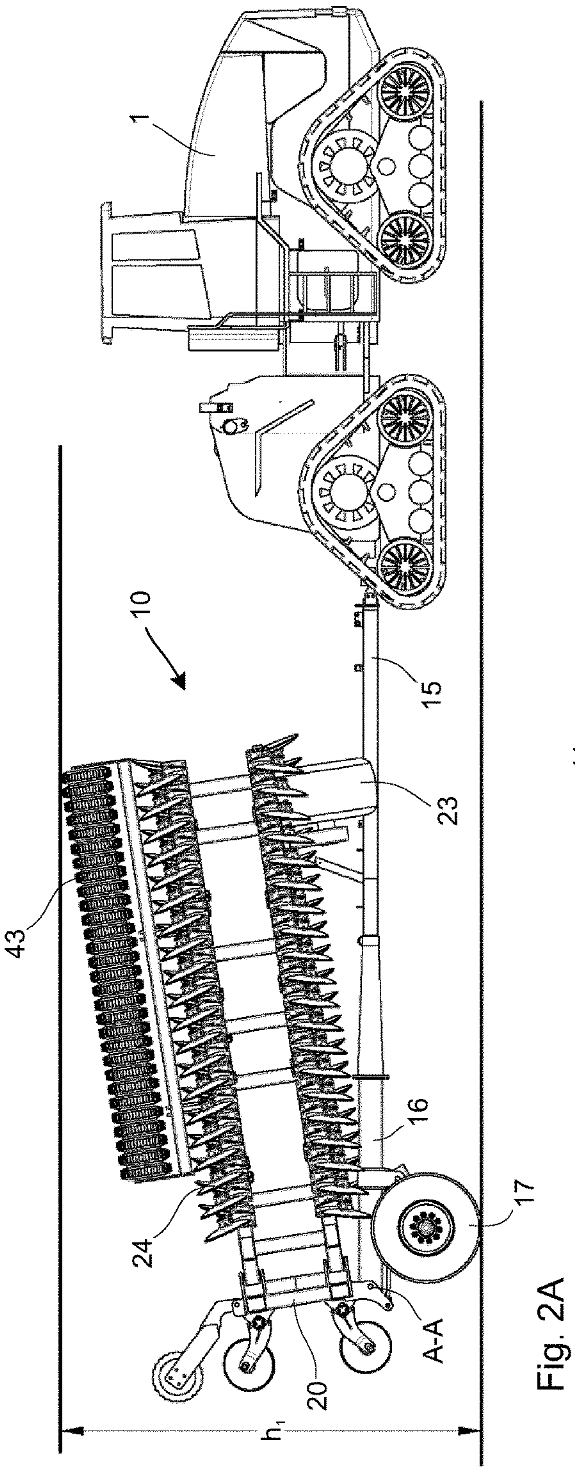
FIG. 2A depicts a right-side view of the tillage implement of FIG. 1 folded into a storage and transport configuration and hitched to a tractor.
Figure 2B:
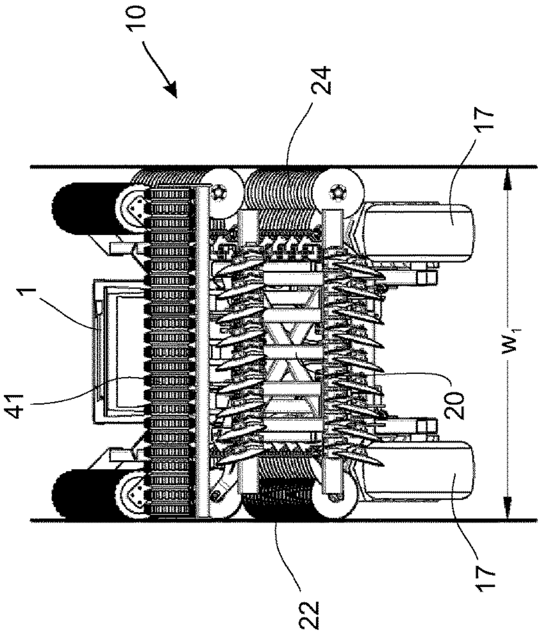
FIG. 2B depicts a rear view of FIG. 2A.
Figure 3A:
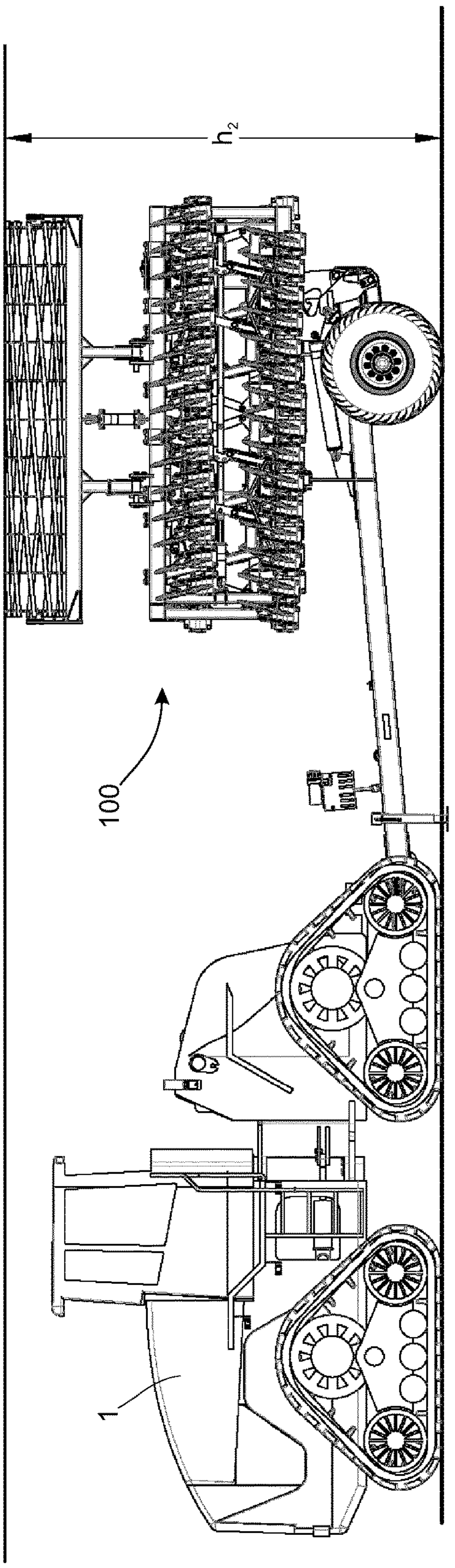
FIG. 3A depicts a left-side view of a two-piece tillage implement comprising a frame having a wing support, a first wing section pivotally mounted on a left side of the wing support and a second wing section pivotally mounted on a right side of the wing support, the tillage implement folded into a storage and transport configuration and hitched to a tractor.
Figure 3B:
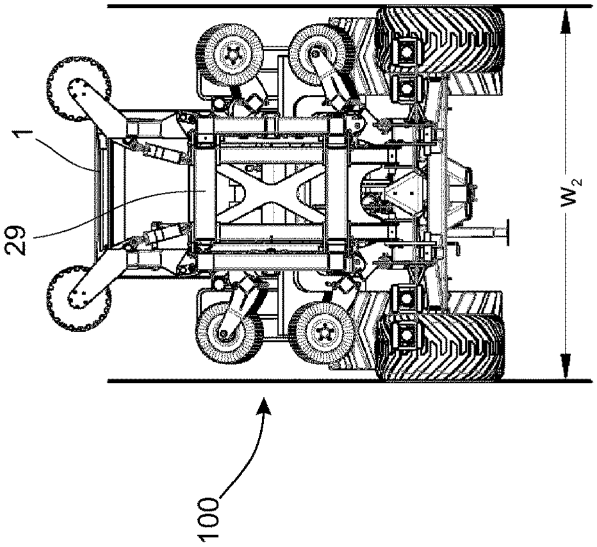
FIG. 3B depicts a rear view of FIG. 3A.
Figure 4:
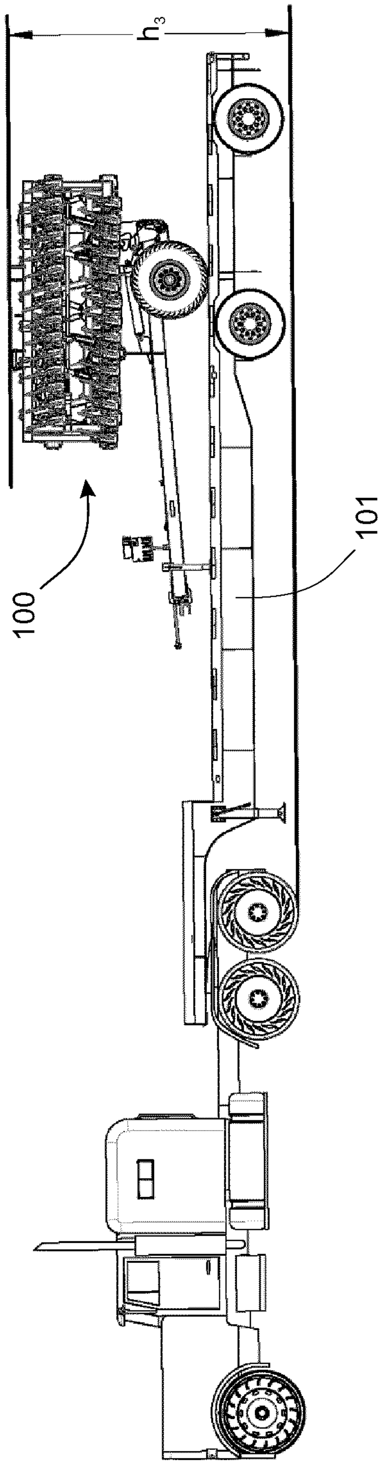
FIG. 4 depicts the two-piece tillage implement of FIG. 3A unhitched from the tractor and loaded on to a drop-deck flat-bed transport trailer.

A three-section tillage implement 10 in accordance with one embodiment of the present invention is illustrated in FIG. 1, FIG. 2A and FIG. 2B, omitting linkage mechanisms for clarity. The three-section tillage implement 10 comprises a frame 12 comprising a plurality of elongated transverse frame elements 13 (only five labeled in FIG. 1) and a plurality of elongated longitudinal frame elements 14 (only five labeled in FIG. 1) rigidly connected together. The frame 12 has a horizontal longitudinal axis parallel to a direction of travel of the tillage implement 10 and a horizontal transverse axis perpendicular to the horizontal longitudinal axis when the tillage implement 10 is in a deployed configuration to till a field. FIG. 1 depicts the deployed configuration. The tillage implement 10 travels in a longitudinally forward direction. The frame 12 comprises a chassis 16. A pair of ground-engaging wheels 17 for supporting the chassis 16 on the ground are rotatably mounted on opposite transverse sides of the chassis 16. A tongue 15 of the tillage implement 10 is connected to the chassis 16 and extends in the longitudinally forward direction from the chassis 16 terminating in a hitch 19 for connecting the tillage implement 10 to a towing vehicle 1, for example a tractor or a truck.

The frame 12 further comprises a wing support in the form of a center section 20 pivotally connected to a rear of the chassis 16 so that the center section 20 can pivot vertically about a center section pivot axis A-A, which is parallel to the horizontal transverse axis of the frame 12.

The frame 12 further comprises a first wing section 22 and a second wing section 24. A proximal transverse end of the first wing section 22 is pivotally connected to a first transverse side of the center section 20 so that the first wing section 22 can pivot vertically about a first wing section pivot axis B-B, which is parallel to the horizontal longitudinal axis of the frame 12 when the tillage implement 10 is in the deployed configuration. A proximal transverse end of the second wing section 24 is pivotally connected to a second transverse side of the center section 20 opposite the first transverse side so that the second wing section 24 can pivot vertically about a second wing section pivot axis C-C, which is parallel to the horizontal longitudinal axis of the frame 12 when the tillage implement 10 is in the deployed configuration. The center section 20 and the wing sections 22, 24 are able to pivot about their respective pivot axes A-A, B-B and C-C to configure the tillage implement 10 between the deployed configuration (FIG. 1) and a storage and transport configuration (FIG. 2A and FIG. 2B).

The first and second wing sections 22, 24 comprise first and second wheels 21, 23, respectively, rotatably mounted thereon which support the first and second wing sections 22, 24 on the ground when the tillage implement 10 is in the deployed configuration (FIG. 1). The first and second wheels 21, 23 are located proximate distal transverse ends of the first and second wing sections 22, 24, respectively. Further, the first and second wheels 21, 23 are situated longitudinally forward of the first and second wing sections 22, 24, respectively. Situating the wheels 21, 23 longitudinally forward of the wing sections 22, 24 permits shortening longitudinal separation between adjacent first transverse frame elements 13*a* and 13*b* of the first wing section 22, and between adjacent second transverse frame elements 13*c* and 13*d* of the second wing section 24, as well as between adjacent transverse frame elements of the center section 20, which shortens the length of the frame 12 and allows space between the adjacent transverse frame elements 13 to provide linkage mechanisms (not shown in FIG. 1) therebetween. The linkage mechanisms are used to control gangs 32 of annular harrow tools 50 (only one labeled) mounted on first transverse frame elements 13*a* and 13*b*, gangs 34 of annular harrow tools 50 (only one labeled) mounted on the second transverse frame elements 13*c* and 13*d*, and gangs of annular harrow tools 50 (only one labeled) mounted on the transverse frame elements of the center section 20.

One or more other tillage tools, for example any one or more of rotary harrows 41, tine harrows 42 and packers 43, may be connected (connections not shown) at a rear of the wing sections 22, 24 and/or the center section 20. The frame sections 20, 22, 24 are usually equipped with tillage tools in the same way to provide equivalent tillage possibilities across the width of the frame 12. The arrangement shown in FIG. 1 is provided to illustrate that various kinds of tillage tools may be mounted on the frame.

As seen in FIG. 2A and FIG. 2B, when the center section 20 and the wings sections 22, 24 are folded up into the storage and transport configuration, the tillage implement 10 acquires a compact height profile hi and a compact width profile $w_1$.

Figure 5:
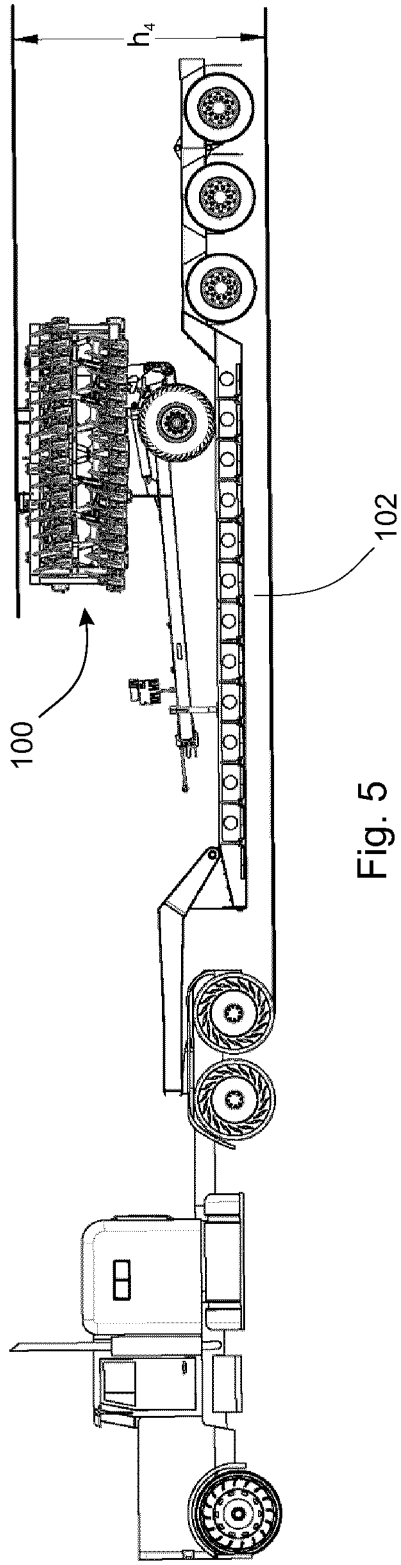
FIG. 5 depicts the two-piece tillage implement of FIG. 3A unhitched from the tractor and loaded on to a double-drop flat-bed transport trailer.
Figure 6A:
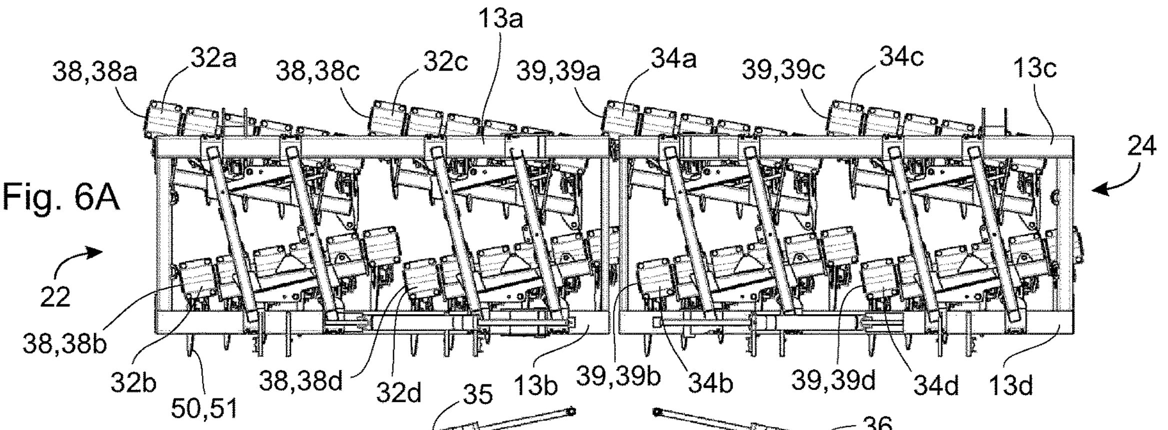
FIG. 6A depicts a top view of a first wing section of a frame of a tillage implement transversely adjacent a second wing section of the frame showing flat coulter blades mounted in pairs in gangs on the wing sections.
Figure 6B:
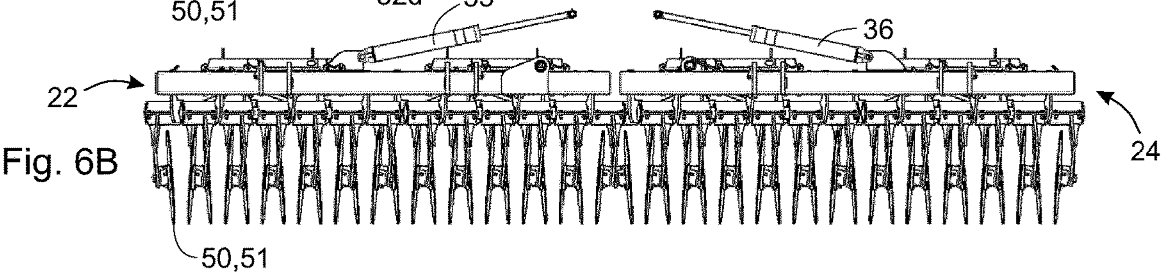
FIG. 6B depicts a rear view of FIG. 6A.
Figure 7A:
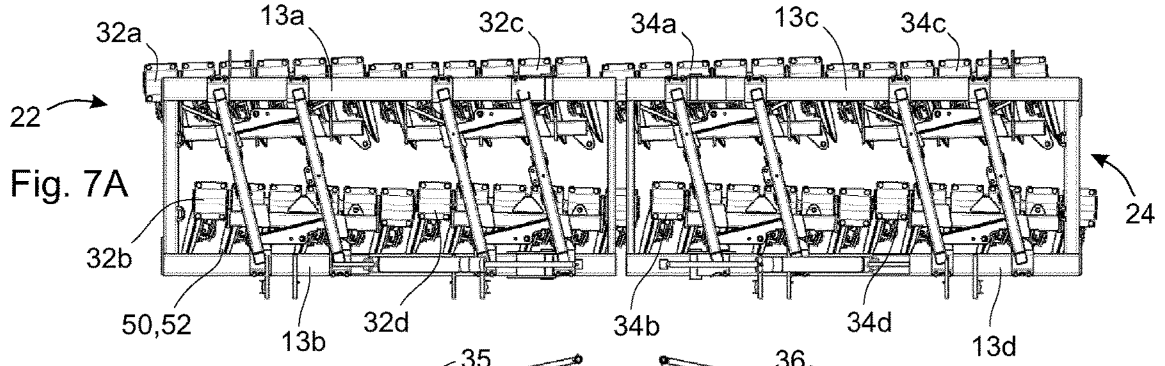
FIG. 7A a top view of a first wing section of a frame of a tillage implement transversely adjacent a second wing section of the frame showing concave disc harrows mounted in gangs on the wing sections.
Figure 7B:
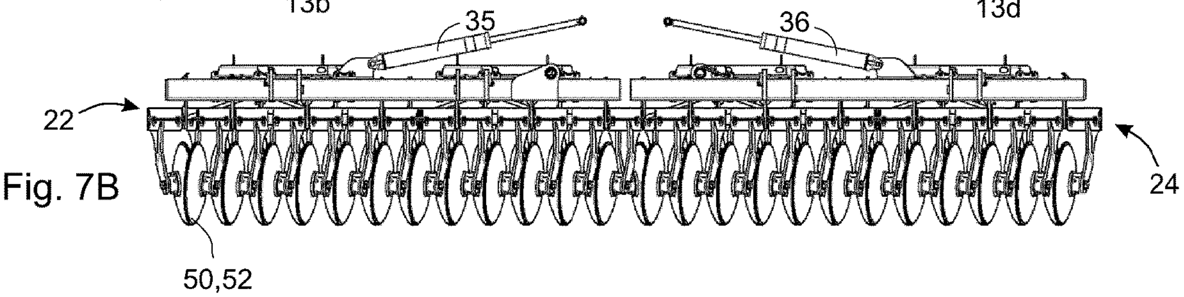
FIG. 7B depicts a rear view of FIG. 7A.
Figure 8A:
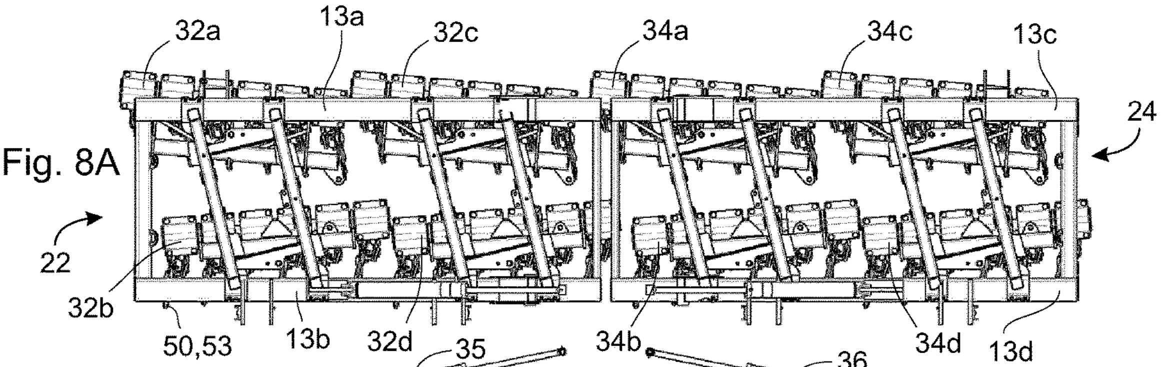
FIG. 8A depicts a top view of a first wing section of a frame of a tillage implement transversely adjacent a second wing section of the frame showing 13-wave coulter blades mounted in pairs in gangs on the wing sections.
Figure 8B:
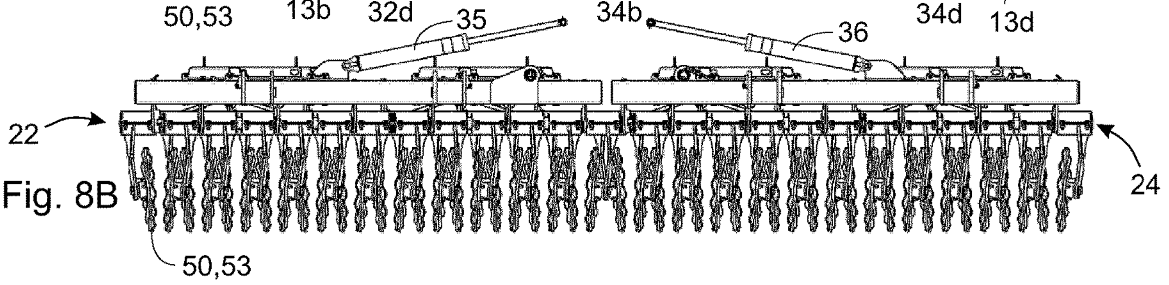
FIG. 8B depicts a rear view of FIG. 8A.

In another embodiment of the present invention, a two-section tillage implement 100 is illustrated in FIG. 3A, FIG. 3B, FIG. 4 and FIG. 5, in which the wing support is not a complete center section with its own tillage tools. Rather, the wing support comprises a narrower sub-frame 29 to which the wing sections are pivotally connected. Otherwise, the two-section tillage implement 100 is substantially the same as the three-section tillage implement 10. The two-section tillage implement 100 has a similar height profile $h_2$ to the three-section tillage implement 10, but has an even more compact width profile $w_2$ than the three-section tillage implement 10. The more compact width profile $w_2$ better suits the two-section tillage implement 100 for transportation on a transport trailer, for example a drop-deck flat-bed transport trailer 101 (FIG. 4) or a double-drop flat-bed transport trailer 102 (FIG. 5). Overall height profile including the transport trailer is somewhat lower for a double-drop flat-bed transport trailer 102 ($h_4$ in FIG. 5) as compared to a drop-deck flat-bed transport trailer 101 ($h_3$ in FIG. 4).

For road traffic, transportation dimensions, such as height and width, must accommodate both transport regulations and physical limits (e.g. hydro wires, bridges and the like), which have limited the ability to transport fully assembled prior art tillage implements by road. The present tillage implement provides more compact transportation dimensions, increasing the ability to transport the fully assembled tillage implement long distances on roads through multiple regulatory jurisdictions, thereby eliminating the need for the recipient of the tillage implement to assemble the implement on arrival.

FIG. 6A to FIG. 9B show the first and second wing sections 22, 24 transversely adjacent to each other out of context of the remainder of the tillage implement, and without the linkage mechanism. The first wing section 22 comprises the longitudinally adjacent and spaced-apart first transverse frame elements 13*a* and 13*b*, and the second wing section 24 comprises the longitudinally adjacent and spaced-apart second transverse frame elements 13*c* and 13*d*. The first transverse frame element 13*a* is a first forward transverse frame element and is longitudinally forward of the other first transverse frame element 13*b*, which is a first rearward transverse frame element. The second transverse frame element 13*c* is a second forward transverse frame element and is longitudinally forward of the other second transverse frame element 13*d*, which is a second rearward transverse frame element. Each of the first transverse frame elements 13*a*, 13*b* have the gangs 32 of annular harrow tools 50 mounted thereon. Each of the second transverse frame elements 13*c*, 13*d* have the gangs 34 of annular harrow tools 50 mounted thereon.

The gangs 32 of annular harrow tools 50 comprise a first gang 32*a*, a second gang 32*b*, a third gang 32*c* and a fourth gang 32*d*, where the first and third gangs 32*a*, 32*c* are mounted on the first forward transverse frame element 13*a*, and the second and fourth gangs 32*b*, 32*d* are mounted on the first rearward transverse frame element 13*b* longitudinally in line with the first and third gangs 32*a*, 32*c*, respectively. The gangs 34 of annular harrow tools 50 comprise a fifth gang 34*a*, a sixth gang 34*b*, a seventh gang 34*c* and an eighth gang 34*d*, where the fifth and seventh gangs 34*a*, 34*c* are mounted on the second forward transverse frame element 13*c*, and the sixth and eighth gangs 34*b*, 34*d* are mounted on the second rearward transverse frame element 13*d* longitudinally in line with the fifth and seventh gangs 34*a*, 34*c*, respectively. The first and second wing sections 22, 24 are essentially identical.

Each of the gangs 32 comprise a toolbar 38 on which the annular harrow tools 50 are mounted on rubber torsion suspensions. The first gang 32*a* comprises a first toolbar 38*a*. The second gang 32*b* comprises a second toolbar 38*b*. The third gang 32*c* comprises a third toolbar 38*c*. The fourth gang 32*d* comprises a fourth toolbar 38*d*. Each of the gangs 34 comprise a toolbar 39 on which the annular harrow tools 50 are mounted on rubber torsion suspensions. The fifth gang 34*a* comprises a fifth toolbar 39*a*. The sixth gang 34*b* comprises a sixth toolbar 39*b*. The seventh gang 34*c* comprises a seventh toolbar 39*c*. The eighth gang 34*d* comprises an eighth toolbar 39*d*. The toolbars 38, 39 are each pivotally mounted on the respective wing sections 22, 24 to be rotatable about vertical rotation axes. Each of the annular harrow tools 50 has a rotating circumferential cutting edge whereby a vertical harrow tool plane through two diametrically opposed points on the circumferential cutting edge is non-perpendicular to a vertical toolbar plane through a length of the toolbar 38 or 39 on which the annular harrow tool 50 is mounted. The vertical harrow tool planes do not rotate with respect to the vertical toolbar plane, except when the suspensions permit resilient deflection when the harrow tools 50 hit obstacles. While the vertical harrow tool plane is shown non-perpendicular the vertical toolbar plane, the vertical harrow tool plane preferably forms an angle of from 0° to 16°, more preferably 8° to 16°, with a line normal of the vertical toolbar plane.

A first actuator 35 connected to the first wing section 22 and to another portion of the frame 12 (e.g. the center section 20) can be actuated to pivot the first wing section 22 about the first wing section pivot axis B-B. A second actuator 36 connected to the second wing section 24 and to another portion of the frame 12 (e.g. the center section 20) can be actuated to pivot the second wing section 24 about the second wing section pivot axis C-C. The actuators 35, 36 may be any suitable actuators, for example hydraulic cylinders, linear actuators and the like.

Figure 9A:
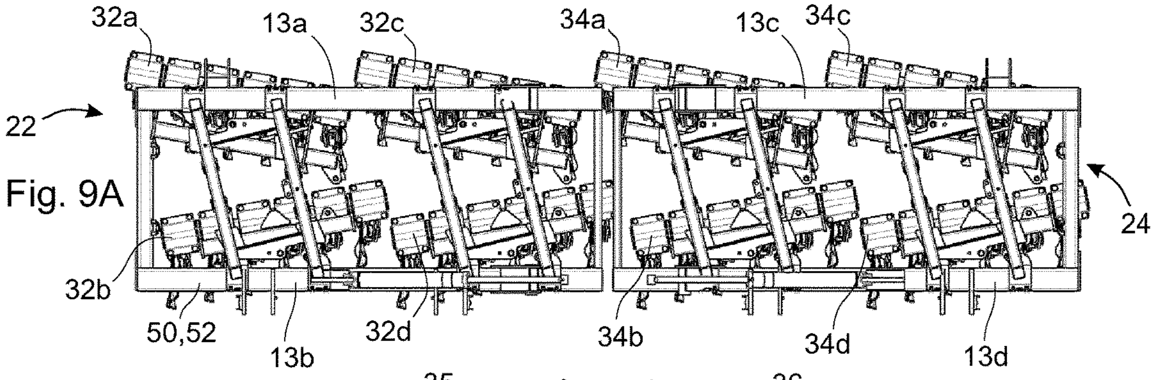
FIG. 9A depicts a top view of a first wing section of a frame of a tillage implement transversely adjacent a second wing section of the frame showing 8-wave coulter blades mounted in pairs in gangs on the wing sections.
Figure 9B:
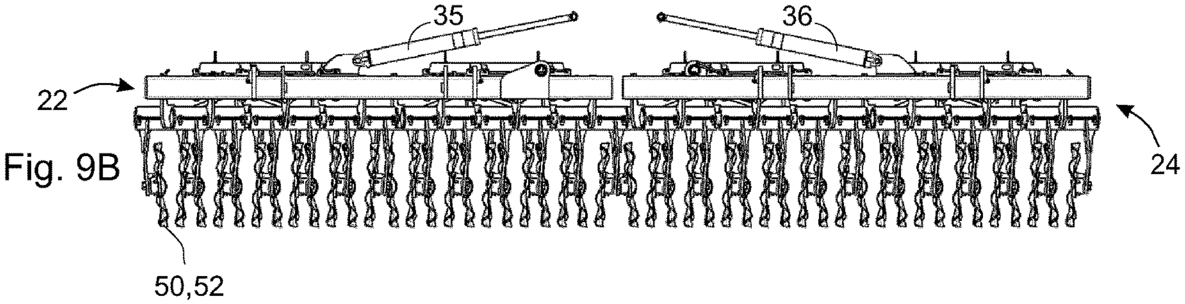
FIG. 9B depicts a rear view of FIG. 9A.

FIG. 6A to FIG. 9B show that the gangs 32, 34 may comprise any one of a variety of different kinds of the annular harrow tools 50, for example flat coulter blades 51 (only one labeled in FIG. 6A and FIG. 6B), concave disc harrows 52 (only one labeled in FIG. 7A and FIG. 7B), 13-wave coulter blades 53 (only one labeled in FIG. 8A and FIG. 8B) and 8-wave coulter blades 54 (only one labeled in FIG. 9A and FIG. 9B). While the gangs 32, 34 in each of the Figures are shown with the same annular harrow tool, one or more of the gangs could comprise different annular harrow tools than the other gangs.

Figure 10A:
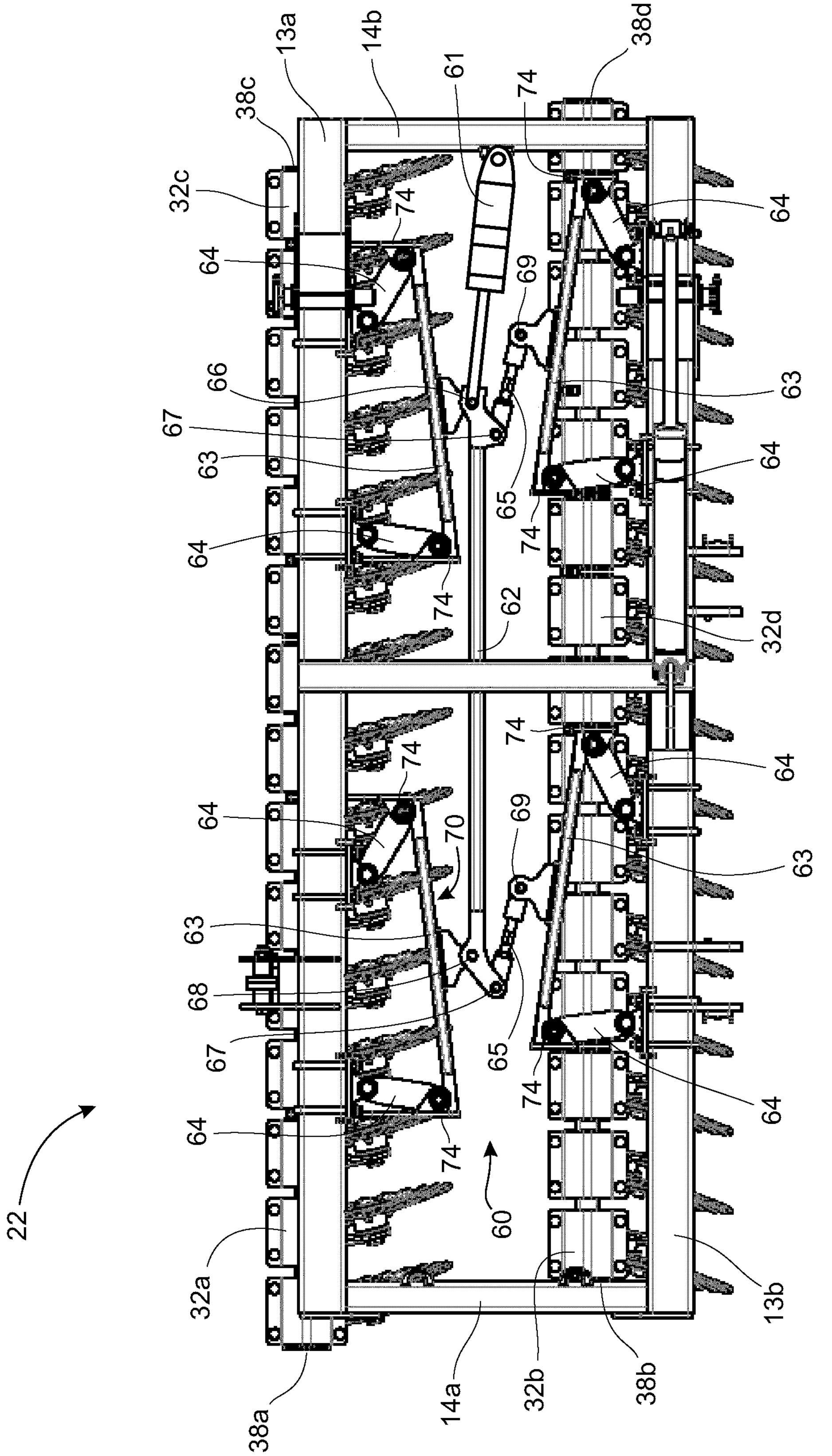
FIG. 10A depicts a top view of a first wing section of a frame of a tillage implement showing a double link linkage mechanism connected to front and rear gangs of annular harrow tools of the first wing section.

FIG. 10A shows the first wing section 22 out of context of the remainder of the tillage implement, the first wing section 22 comprising a double link linkage mechanism 60 pivotally linked to each of the four gangs 32*a*, 32*b*, 32*c*, 32*d* through respective gang assemblies 70, the double link linkage mechanism 60 disposed longitudinally between the first toolbar 38*a* and the second toolbar 38*b*, and longitudinally between third toolbar 38*c* and the fourth toolbar 38*d*. The description of FIG. 10A applies similarly to the second wing section 24.

The double link linkage mechanism 60 is operated by an actuator 61 mounted on a longitudinal frame member 14*b* of the first wing section 22. The actuator 61 is pivotally connected to the double link linkage mechanism 60. Operation of the actuator 61 operates the double link linkage mechanism 60 and the actuator 61 is controlled from the towing vehicle towing the implement. The actuator 61 may comprise any suitable actuator, for example a hydraulic cylinder or a linear actuator.

Figure 10B:
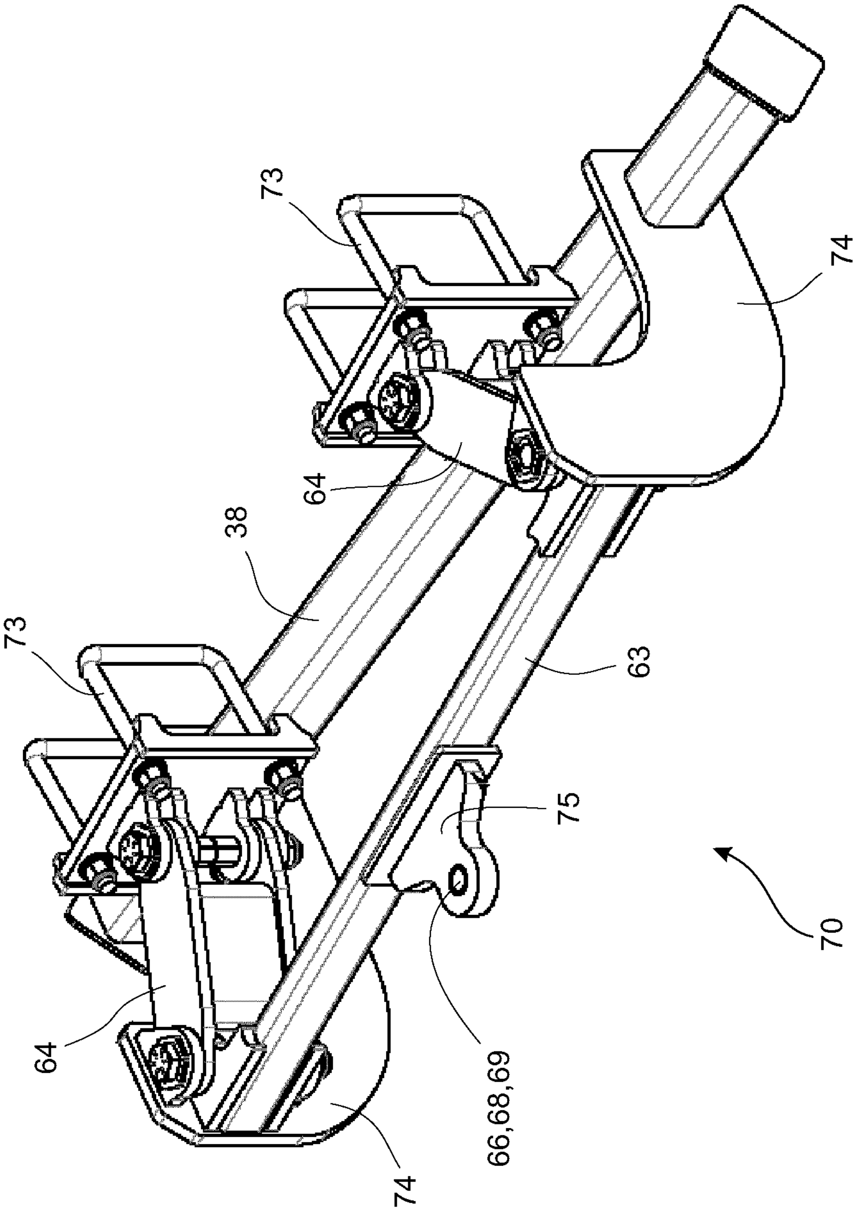
FIG. 10B depicts a gang assembly mountable on an elongated transverse frame element, the gang assembly adapted to be pivotally connected to the double link linkage mechanism shown in FIG. 10A.

FIG. 10B illustrates details of the gang assemblies 70. Each gang assembly 70 comprises a rigid quadrilateral formed by the toolbar 38, an opposed support bar 63 and a pair of support brackets 74 rigidly connecting the toolbar 38 to the support bar 63. The support bar 63 comprises a flange 75 to which the double link linkage mechanism 60 is pivotally linked. The gang assembly 70 is mounted on one of the transverse frame elements 13 through a pair of gang assembly mounts 73. The gang assembly 70 is pivotally connected to the gang assembly mounts 73 by respective gang assembly linkage arms 64, whereby the gang assembly linkage arms 64 are portions of the double link linkage mechanism 60 and are pivotally connected to both the gang assembly mounts 73 and the support bar 63.

Still referring to FIG. 10A and FIG. 10B, the double link linkage mechanism 60 comprises a plurality of pivotally connected linkage arms. The plurality of linkage arms comprises the gang assembly linkage arms 64 and a transversely extending control rod 62, the control rod 62 pivotally connected to the actuator 61. The control rod 62 is also pivotally connected to the four gang assemblies 70 (only one labeled in FIG. 10A), each gang assembly 70 mounting one of the four toolbars 38*a*, 38*b*, 38*c*, 38*d* to one or the other of the two transverse frame elements 13*a*, 13*b*. In the illustrated embodiment, the control rod 62 is directly pivotally connected to the gang assemblies 70 for the front transverse frame elements 13*a* and 13*c* at a pivot points 68 and 66, respectively, on the flanges 75 of respective support bars 63. The control rod 62 is indirectly pivotally connected to the gang assemblies 70 for the rear transverse frame elements 13*b* and 13*d* through connecting arms 65 at a pivot points 67 between the control rod 62 and the connecting arms 65, and each of the connecting arms 65 is directly pivotally mounted at a pivot point 69 on the support bar 63 associated with the second or fourth toolbar 38*b*, 38*d*, respectively. The control rod 62 is directly pivotally mounted on the support bars 63 associated with the first and third toolbars 38*a*, 38*c*, respectively. Connection to each support bar 63 is at a location about half way along a length of the support bar 63. Each of the connecting arms 65 could instead be directly pivotally mounted on one the support bars 63 associated with the first and third toolbars 38*a*, 38*c*, respectively, and the control rod 62 directly pivotally mounted on the support bar 63 associated with the second and fourth toolbars 38*b*, 38*d*, respectively. The actuator 61 is directly pivotally mounted on both the control rod 62 and one of the support bars 63 to which the control rod 62 is also directly pivotally mounted, the actuator 61 and the control rod 62 sharing a common pivot point 66 on the support bar 63 on which both the actuator 61 and the control rod 62 are directly mounted. Further, the pivot points 67 between the control rod 62 and the two connecting arms 65 are at different locations on the control rod 62 than pivot points 66, 68 between the control rod 62 and the two support bars 63 on which the control rod 62 is directly pivotally mounted. Overall, the double link linkage mechanism 60 comprises the control rod 62, the connecting arms 65 and the gang assembly linkage arms 64. In this way, a single common control rod 62 simultaneously controls rotation of all four toolbars 38*a*, 38*b*, 38*c* and 38*d*. Further, actuation of the actuator 61 causes the first and third toolbars 38*a*, 38*c*, respectively, to rotate in opposite rotational directions about the respective vertical rotation axes than the second and fourth toolbars 38*b*, 38*c*.

Figure 11A:
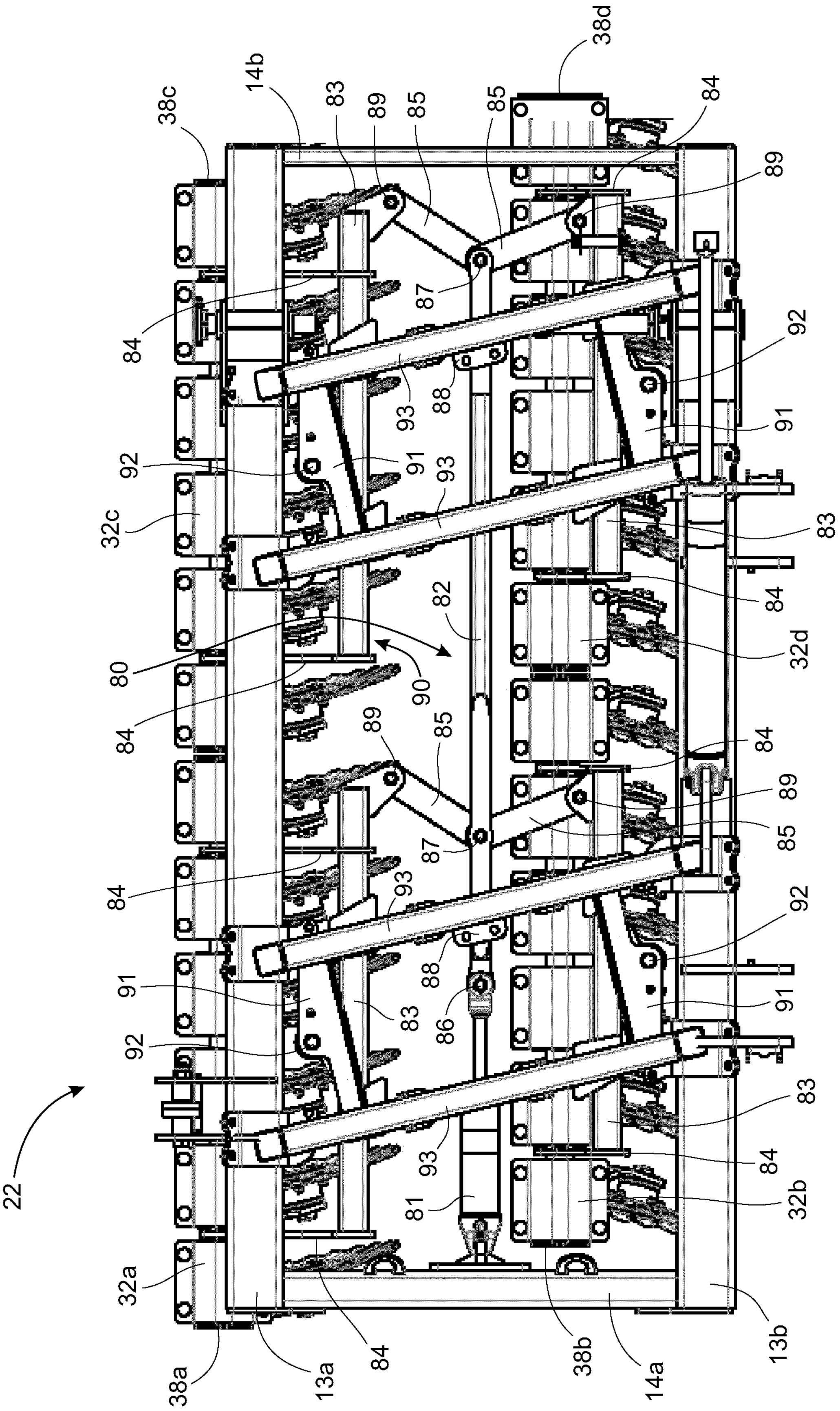
FIG. 11A depicts a top view of a first wing section of a frame of a tillage implement showing a center pivot linkage mechanism connected to front and rear gangs of annular harrow tools of the first wing section.
Figure 11B:
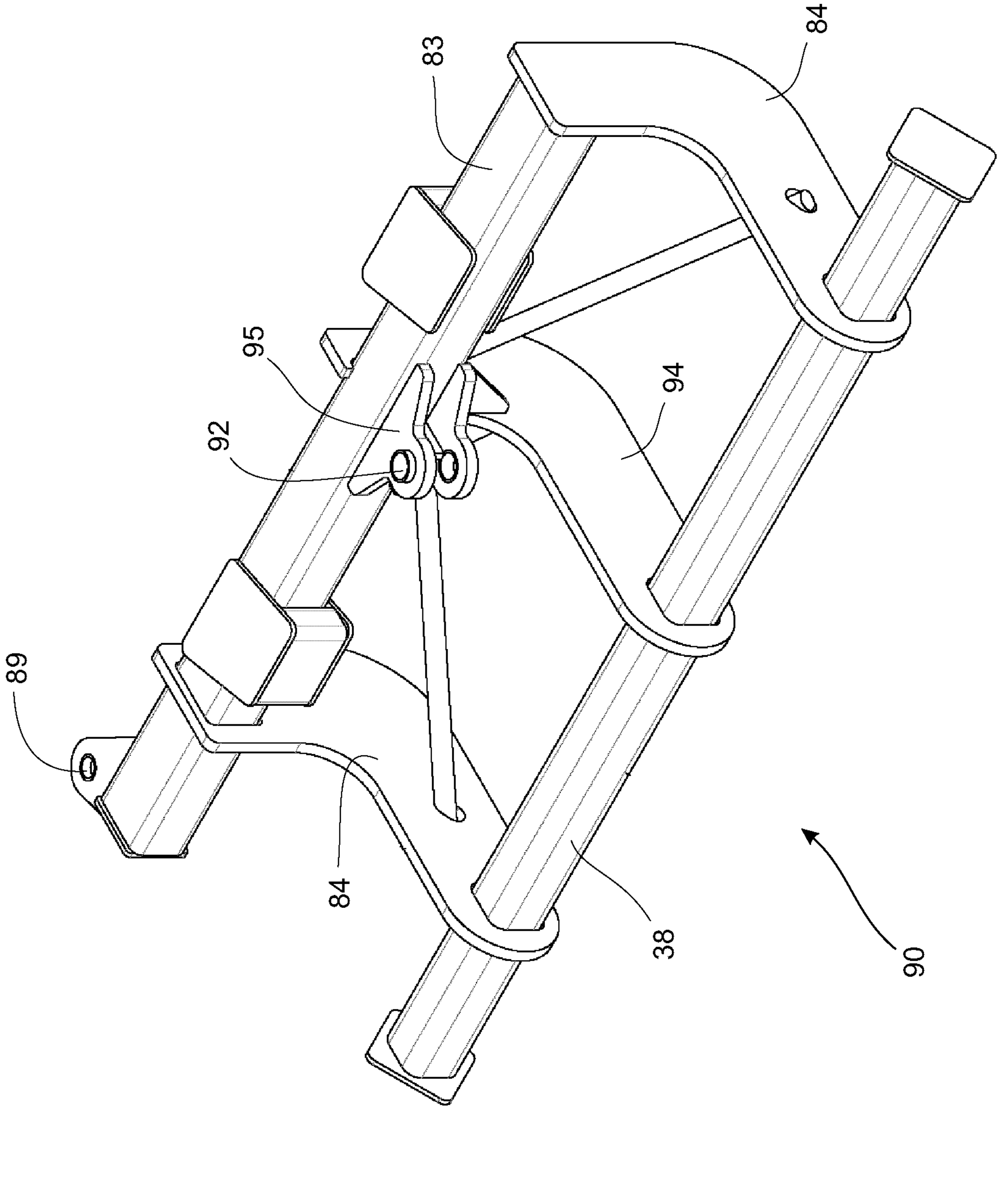
FIG. 11B depicts a gang assembly mountable on an elongated transverse frame element, the gang assembly adapted to be pivotally connected to the center pivot linkage mechanism shown in FIG. 11A.
Figure 12A:
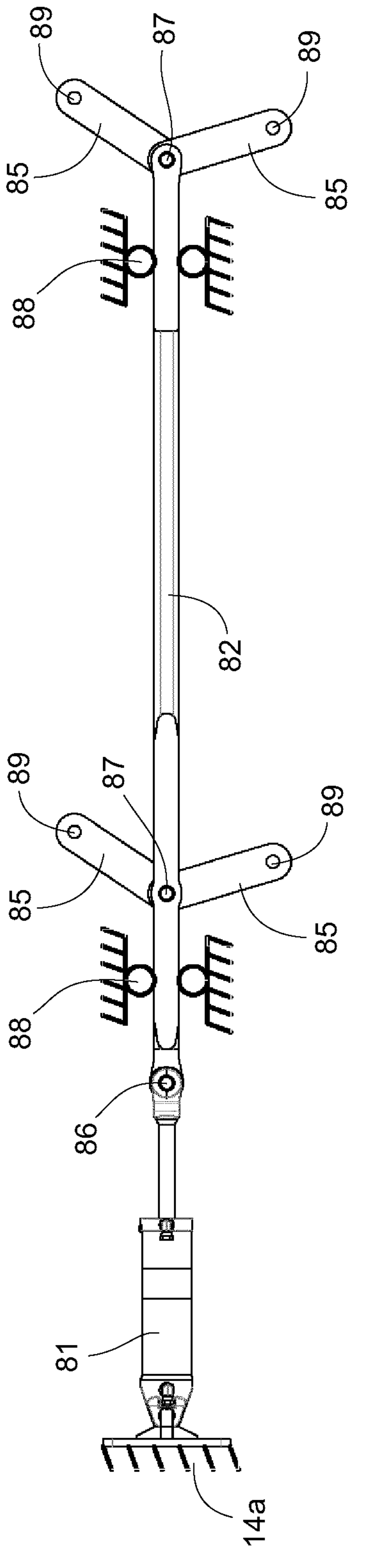
FIG. 12A depicts a top view of a control linkage of the center pivot linkage mechanism shown in FIG. 11A.
Figure 12B:
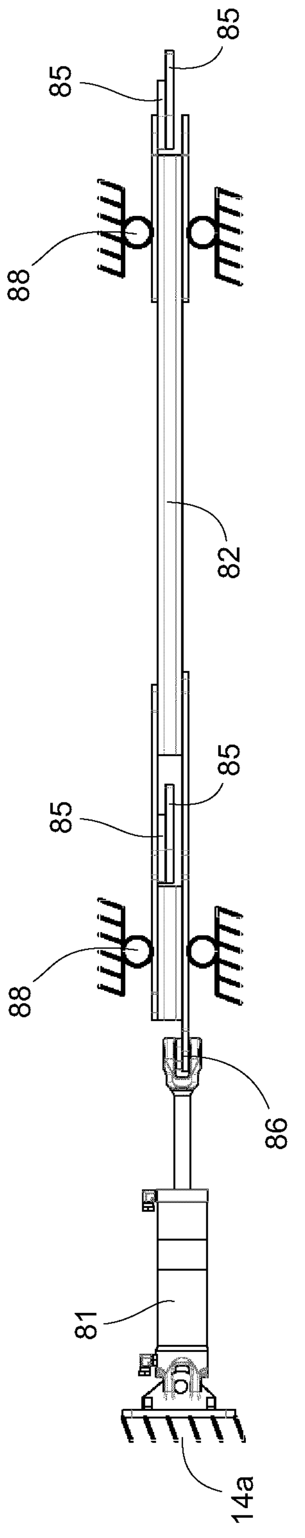
FIG. 12B depicts a front view of FIG. 12A.

FIG. 11A shows the first wing section 22 out of context of the remainder of the tillage implement, the first wing section 22 comprising a center pivot linkage mechanism 80 pivotally linked to each of the four gangs 32*a*, 32*b*, 32*c*, 32*d* through four respective gang assemblies 90 (only one labeled in FIG. 11A), the double link linkage mechanism 80 disposed longitudinally between the first toolbar 38*a* and the second toolbar 38*b*, and longitudinally between the third toolbar 38*c* and the fourth toolbar 38*d*. FIG. 11B illustrates details of the gang assemblies 90. FIG. 12A and FIG. 12B show detail of the center pivot linkage mechanism 80. The descriptions of FIG. 11A, FIG. 11B, FIG. 12A and FIG. 12B apply similarly to the second wing section 24. The center pivot linkage mechanism 80 is operated by an actuator 81 mounted on a longitudinal frame member 14*a* of the first wing section 22. The actuator 81 is pivotally connected to the center pivot linkage mechanism 80. Operation of the actuator 81 operates the center linkage mechanism 80 and the actuator 81 is controlled from the towing vehicle towing the implement. The actuator 81 may comprise any suitable actuator, for example a hydraulic cylinder or a linear actuator.

Each gang assembly 90 comprises a rigid quadrilateral formed by the toolbar 38, an opposed support bar 83 and a pair of outer support brackets 84 rigidly connecting the toolbar 38 to the support bar 83. An inner support bracket 94 also rigidly connects the toolbar 38 to the support bar 83 for added strength. The support bar 63 comprises a mounting flange 95 through which the gang assembly 90 is rotatably mounted to frame.

Still referring to FIG. 11A, FIG. 11B, FIG. 12A and FIG. 12B, the center pivot linkage mechanism 80 comprises a plurality of pivotally connected linkage arms. The plurality of linkage arms comprises a transversely extending control rod 82 and four connecting arms 85. The control rod 82 is pivotally connected to all four of the support bars 83 through the connecting arms 85. Each of the connecting arms 85 is pivotally mounted on the respective support bar 83 at pivot points 89 and pivotally mounted directly on the control rod 82 at pivot points 87. Connection of the connecting arms 85 to the support bars 83 is at a location proximate one end of each of the support bars 83. The actuator 81 is directly pivotally mounted on one end of control rod 82 at pivot point 86. Further, the pivot points 87 between the control rod 82 and the two connecting arms 85 connecting longitudinally aligned toolbars, i.e. toolbars 38*a* and 38*b* or toolbars 38*c* and 38*d*, are at a common location on the control rod 82. Each of the gang assemblies 70 are also rotatably mounted on top plates 91 through the mounting flanges 95 at pivot points 92, the pivot points 92 defining the vertical axes of rotation of the toolbars 38*a*, 38*b*, 38*c* and 38*d*. The top plates 91 are secured to longitudinal braces 93 attached to the transverse frame elements 13*a* and 13*b*. In this way, a single common control rod 82 simultaneously controls rotation of all four toolbars 38*a*, 38*b*, 38*c* and 38*d*. Further, actuation of the actuator 81 causes the first and third toolbars 38*a*, 38*c*, respectively, to rotate in opposite rotational directions about the respective vertical rotation axes than the second and fourth toolbars 38*b*, 38*c*. Furthermore, to ensure proper motion of the control rod 82, the control rod 82 is supported on both sides by roller or slider assemblies 88 (see FIG. 12A and FIG. 12B) mounted on the longitudinal braces 93.

Figure 13A:
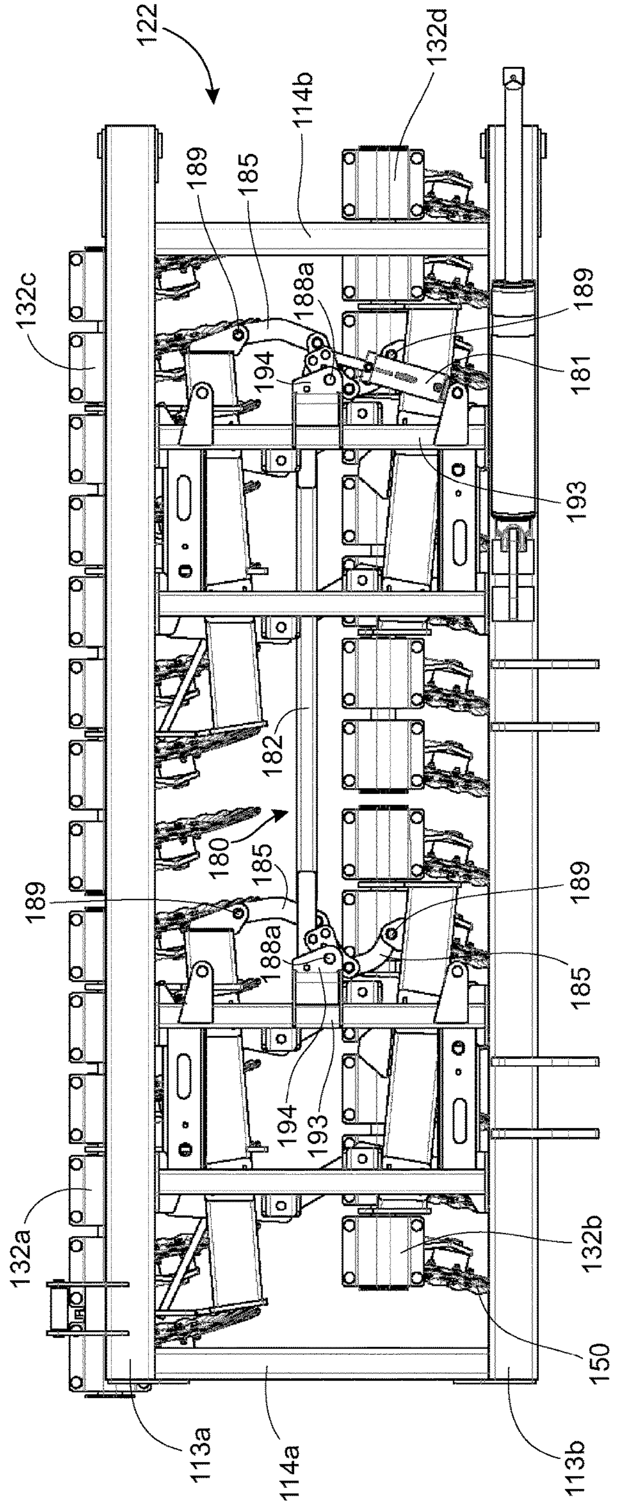
FIG. 13A depicts a top view of a first wing section of a frame of a tillage implement showing an alternative center pivot linkage mechanism connected to front and rear gangs of annular harrow tools of the first wing section.
Figure 13B:
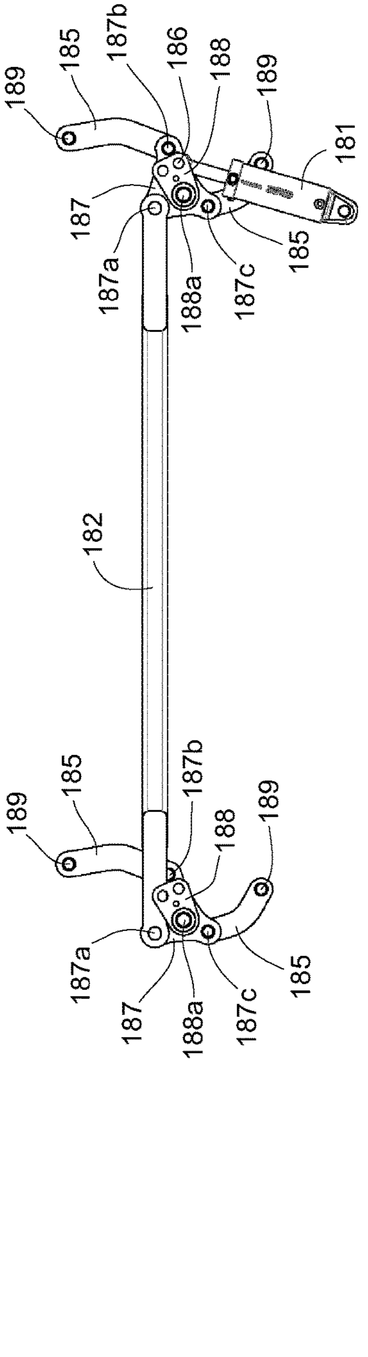
FIG. 13B depicts a top view of a control linkage of the center pivot linkage mechanism shown in FIG. 13A.

FIG. 13A shows a first wing section 122 similar in construction and operation to the first wing section of FIG. 11A. The first wing section 122 comprises a bell crank-style center pivot linkage mechanism 180. FIG. 13B shows a bell crank control linkage of the bell crank-style center pivot linkage mechanism 180.

Similar to FIG. 11A, the first wing section 122 shown in FIG. 13A comprises first longitudinally spaced-apart transverse frame elements 113*a* and 113*b* connected by first transversely spaced-apart longitudinal frame elements 114*a* and 114*b* and by transversely spaced-apart longitudinal braces 193. Four gangs 132*a*, 132*b*, 132*c*, 132*d* of annular harrow tools 150 (only one labeled) are mounted on the transverse frame elements 113*a* and 113*b*. In a manner similar to FIG. 11A, the center pivot linkage mechanism 180 is pivotally linked to each of the four gangs 132*a*, 132*b*, 132*c*, 132*d* through four respective gang assemblies, the center pivot linkage mechanism 180 disposed longitudinally between longitudinally spaced-apart toolbars of the gangs 132*a*, 132*b*, 132*c*, 132*d*. The gang assemblies are of similar construction to the gang assembly shown in FIG. 11B. The primary difference between the first wing section 122 of FIG. 13A and the first wing section 22 of FIG. 11A is the construction of the control linkage.

As best seen in FIG. 13B, the bell crank-style center pivot linkage mechanism 180 comprises a plurality of pivotally connected linkage arms. The plurality of linkage arms comprises a transversely extending control rod 182 and four arcuate connecting arms 185. The control rod 182 is pivotally connected to all four support bars of the gang assemblies through the connecting arms 185. Each of the connecting arms 185 is pivotally mounted on the respective support bar at pivot points 189 and pivotally mounted to the control rod 182 through generally triangular pivot plates 187 at pivot points 187*b*, 187*c*. The control rod 182 is pivotally connected to the pivot plates 187 at pivot points 187*a*. The pivot points 187*a*, 187*b*, 187*c* on a given pivot plate 187 are spaced-apart from each other, preferably situated at the apexes of the triangular pivot plate 187. Similar to the arrangement shown in FIG. 11A, connection of the connecting arms 185 to the support bars of the gang assemblies is at a location proximate one end of each of the support bars.

An actuator 181 is used to cause the control rod 182 to translate transversely. However, the positioning an orientation of the actuator 181 is different than in FIG. 11A because the arcuate connecting arms 185 and the triangular pivot plates 187 to which the arcuate connecting arms 185 and the control rod 182 are pivotally linked to provide for bell crank motion. A bell crank is a type of crank that changes motion through an angle. Thus, the actuator 181 can be positioned and oriented to better relate to an angle on the annular harrow tools 150, while still providing for transverse translation of the control rod 182. The actuator 181 is thus mounted on one of the longitudinal braces 193 at a location proximate one of the transverse frame elements, for example the transverse frame element 113*b*, and pivotally mounted on one of the triangular pivot plates 187 at pivot point 186. Alternatively, the actuator 181 can be mounted directly to the transverse frame element or another part of the frame. The actuator 181 is thereby oriented in a direction that is closer to parallel with the orientation of the plane of the annular harrow tools 150, which provides better control of the position of the gangs 132*a*, 132*b*, 132*c*, 132*d*. The actuator 181 thus transfers its motion through a non-zero angle into the control rod 182, the control rod 182 transferring motion to the gangs 132*a*, 132*b*, 132*c*, 132*d* to adjust the angle of the gangs 132*a*, 132*b*, 132*c*, 132*d*. The bell crank control linkage can be connected through a connector linkage to one or more other bell crank control linkages to permit a single actuator to control additional gangs of annular harrow tools.

To provide further support for the center pivot linkage mechanism 180, the triangular pivot plates 187 are pivotally mounted to the longitudinal braces 193 through support plates 188 pivotally mounted at pivot point 188*a* to the pivot plates 187 and to the support flanges 194 attached to the braces 193. Because the pivot point 186 and the pivot points 187*a* are offset from the pivot points 188*a*, actuation of the actuator 181 cause the pivot plates 187 to rotate arcuately about the pivot points 188*a* thereby causing the control rod 182 to translate linearly in the transverse direction to transmit motion through all of the arcuate links 185 to the gang assemblies. In this way, a single common bell crank control rod 182 simultaneously controls rotation of all four gangs in the same manner as described for the arrangement in FIG. 11A.

Figure 14A:
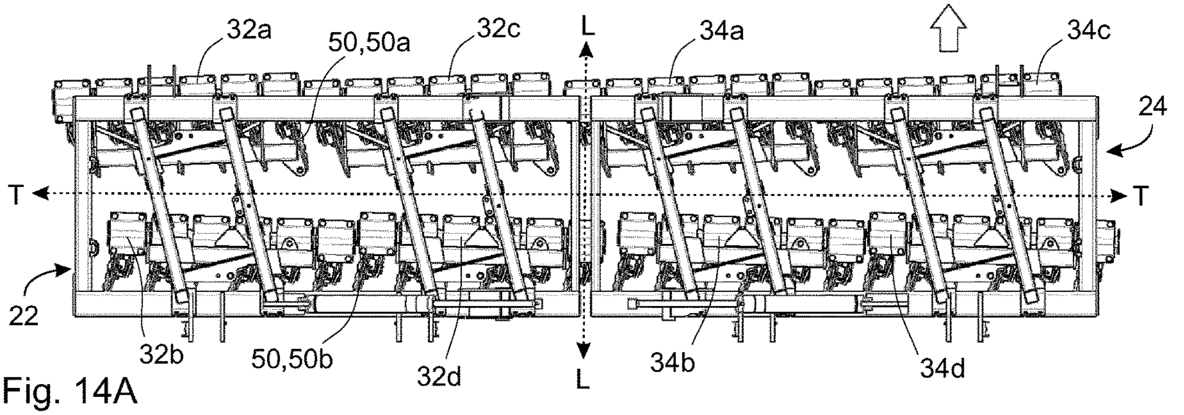
FIG. 14A depicts a top view of a first wing section of a frame of a tillage implement transversely adjacent a second wing section of the frame showing front and rear gangs of annular harrow tools in which long axes of toolbars of the front gangs are angled at −2° with respect to a transverse axis of the implement and the annular harrow tools of the front gangs are angled at −14° with respect to a longitudinal axis of the implement.
Figure 14B:
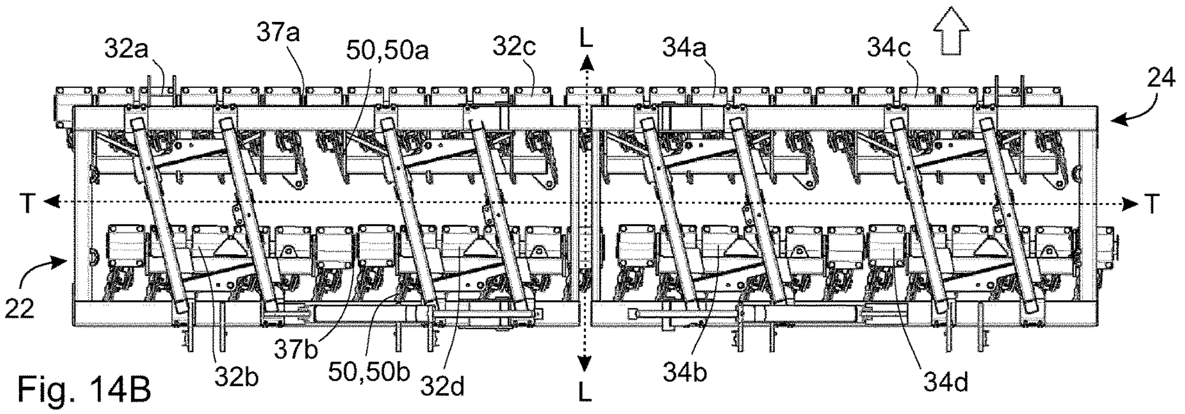
FIG. 14B depicts FIG. 14A except that the front gangs are angled at 0° with respect to the transverse axis and the annular harrow tools of the front gangs are angled at −12° with respect to the longitudinal axis.
Figure 14C:
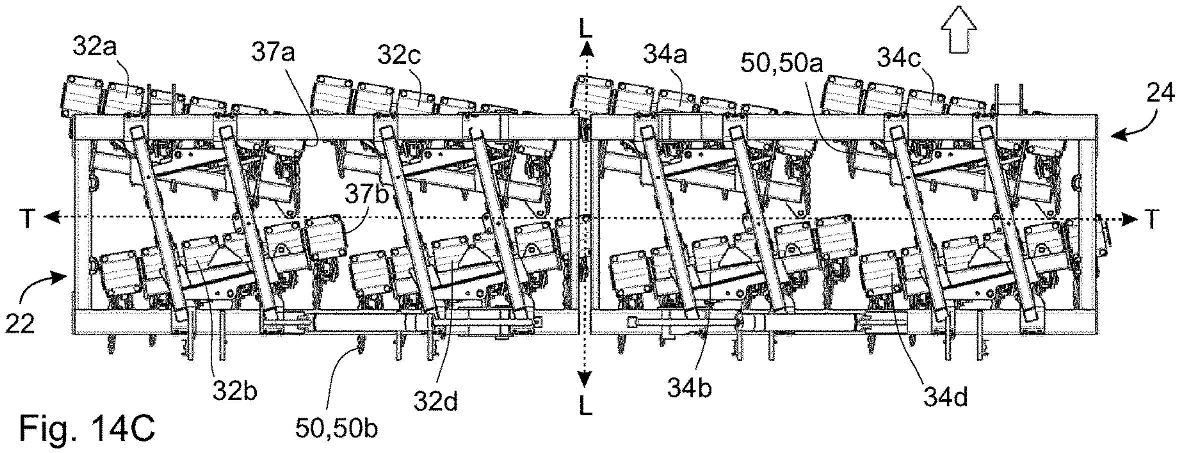
FIG. 14C depicts FIG. 14A except that the front gangs are angled at 10° with respect to the transverse axis and the annular harrow tools of the front gangs are angled at −2° with respect to the longitudinal axis.

FIG. 14A, FIG. 14B and FIG. 14C show the first and second wing sections 22, 24 transversely adjacent to each other out of context of the remainder of the tillage implement, and without the linkage mechanisms shown, though the wing sections 22, 24 illustrated would each comprise the center pivot linkage mechanism 80. Forward direction is indicated by a large arrow in each of FIG. 14A, FIG. 14B and FIG. 14C. FIG. 14A, FIG. 14B and FIG. 14C illustrate the orientations and the range of motion of the gangs 32*a*, 32*b*, 32*c*, 32*d*, 34*a*, 34*b*, 34*c*, 34*d* of the two wing sections 22, 24 as the toolbars are rotated simultaneously in opposite rotational directions about their respective vertical axes of rotation by operation of the linkage mechanisms. The orientations and range of motion of the gangs 32*a*, 32*b*, 32*c*, 32*d*, 34*a*, 34*b*, 34*c*, 34*d* would be similar when the wing sections 22, 24 comprise the double link linkage mechanism 60.

As shown in FIG. 14A, at one extreme of rotation, long axes of the toolbars of the front gangs 32*a*, 32*c*, 34*a*, 34*c* are angled at −2° with respect to a horizontal transverse axis T-T of the implement, and annular harrow tools 50*a* (only one labeled) of the front gangs 32*a*, 32*c*, 34*a*, 34*c* are angled at −14° with respect to a longitudinal axis L-L of the implement. Further, long axes of the toolbars of the rear gangs 32*b*, 32*d*, 34*b*, 34*d* are angled at 2° with respect to a horizontal transverse axis T-T of the implement, and the annular harrow tools 50*b* (only one labeled) of the rear gangs 32*b*, 32*d*, 34*b*, 34*d* are angled at 14° with respect to a horizontal longitudinal axis L-L of the implement. In such an orientation, the gangs 32*a*, 32*b*, 32*c*, 32*d*, 34*a*, 34*b*, 34*c*, 34*d* are almost parallel to the transverse axis T-T and the annular harrow tools 50 are in aggressive tillage positions.

When the gangs 32*a*, 32*b*, 32*c*, 32*d*, 34*a*, 34*b*, 34*c*, 34*d* are rotated so that the front and rear gangs 32*a*, 32*b*, 32*c*, 32*d*, 34*a*, 34*b*, 34*c*, 34*d* are all angled at 0° (i.e. parallel) with respect to the transverse axis T-T as seen in FIG. 14B, the annular harrow tools 50*a* of the front gangs 32*a*, 32*c*, 34*a*, 34*c* are angled at −12° with respect to the longitudinal axis L-L, and the annular harrow tools 50*b* of rear gangs 32*b*, 32*d*, 34*b*, 34*d* are angled at 12° with respect to the longitudinal axis L-L. The annular harrow tools 50 are still in aggressive tillage positions, though not quite as aggressive as in FIG. 14A, but the front gangs 32*a*, 32*c*, 34*a*, 34*c* are now longitudinally separated from the rear gangs 2*b*, 32*d*, 34*b*, 34*d* by a maximum distance at the closest separation of the gangs 32*a*, 32*b*, 32*c*, 32*d*, 34*a*, 34*b*, 34*c*, 34*d* to permit maximum soil flow through the implement.

When the gangs 32*a*, 32*b*, 32*c*, 32*d*, 34*a*, 34*b*, 34*c*, 34*d* are rotated so that the front gangs 32*a*, 32*c*, 34*a*, 34*c* are angled at 10° and the rear gangs 32*b*, 32*d*, 34*b*, 34*d* are angled at −10° with respect to the transverse axis T-T as seen in FIG. 14C, the annular harrow tools 50*a* of the front gangs 32*a*, 32*c*, 34*a*, 34*c* are angled at −2° with respect to the longitudinal axis L-L and the annular harrow tools 50*b* are angled at 2° with respect to the longitudinal axis L-L. The annular harrow tools 50 are now in a non-aggressive tillage position. Comparing FIG. 14C to FIG. 14, it can be seen that when the annular harrow tools 50 are in a non-aggressive tillage position (FIG. 14C), an end 37*a* (only one labeled) of each of the front gangs 32*a*, 32*c*, 34*a*, 34*c* is longitudinally much closer to a corresponding end 37*b* of the corresponding longitudinally aligned rear gangs 32*b*, 32*d*, 34*b*, 34*d*. If the annular harrow tools 50 were in an aggressive tillage position with the gangs 32*a*, 32*b*, 32*c*, 32*d*, 34*a*, 34*b*, 34*c*, 34*d* so oriented, the implement would be subject to plugging by soil at the ends 37*a*, 37*b* because the front gangs 32*a*, 32*c*, 34*a*, 34*c* would be insufficiently longitudinally separated from the rear gangs 32*b*, 32*d*, 34*b*, 34*d* at the ends 37*a*, 37*b* of the front and rear gangs, respectively.

Figure 15A:
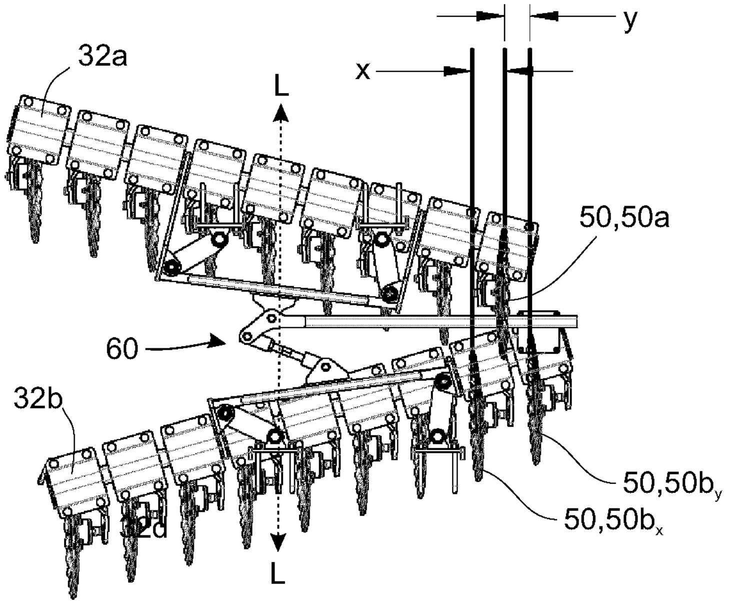
FIG. 15A, FIG. 15B and FIG. 15C depicts top views of front and rear gangs of annular harrow tools connected by the double link linkage mechanism shown in FIG. 10 illustrating how the gangs rotate about virtual vertical rotation axes as the gangs are simultaneously rotated by the linkage mechanism to rotate the annular harrow tools through an angle of 14° with respect to a longitudinal axis of the tillage implement.
Figure 15B:
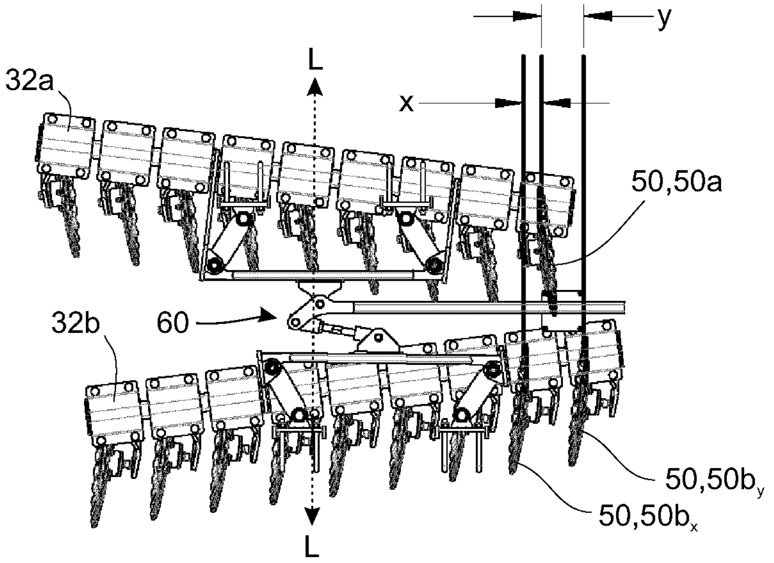
Figure 15C:
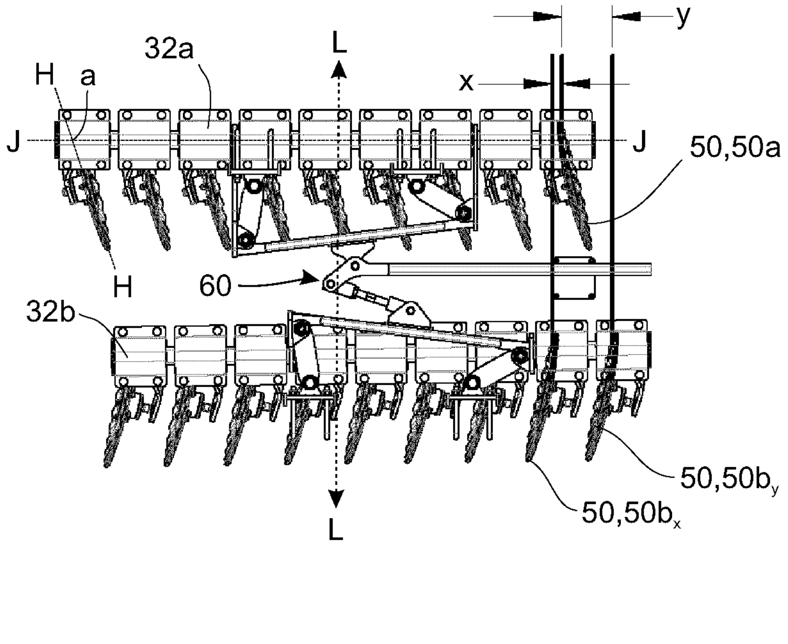

FIG. 15A, FIG. 15B and FIG. 15C illustrate how simultaneously rotating the front and rear gangs 32*a*, 32*b*, respectively, in opposite rotational directions about their respective vertical rotation axes using the double link linkage mechanism 60 causes shifting of the relative transverse positions of the points at which rotating circumferential cutting edges of the annular harrow tools 50*a* (only one labeled) of the front gang 32*a* contact the field and the points at which the rotating circumferential cutting edges of the annular harrow tools 50*b* (only two labeled) of the rear gang 32*b* contact the field. As seen in FIG. 15C, two diametrically opposed points on the circumferential cutting edge of the annular harrow tool 50 define a vertical harrow tool plane H-H (only one labeled) through the annular harrow tool 50. Because the harrow tools 50 mounted on the toolbars of the gangs are not rotatable on the toolbars, except when the suspension permits resilient deflection when the harrow tool 50 hits an obstacle, an angle a (only one labeled) between the vertical harrow tool plane H-H and a vertical toolbar plane J-J (only one labeled) through a length of the toolbar remains constant as the gangs rotate about their respective vertical rotation axes.

In FIG. 15A, all of the annular harrow tools 50 are in a least aggressive tillage position where the vertical harrow tool planes H-H through two diametrically opposed points on the circumferential cutting edges of the annular harrow tools 50 are parallel to the longitudinal axis L-L of the implement. A given annular harrow tool 50*a* of the front gang 32*a* is transversely offset from a first transversely adjacent annular harrow tool $50b_x$ of the rear gang 32*b* by a first transverse offset distance of x. The given annular harrow tool 50*a* of the front gang 32*a* is also transversely offset from a second transversely adjacent annular harrow tool $50b_y$ of the rear gang 32*b* by a second transverse offset distance of y in the opposite transverse direction as x. The annular harrow tools $50b_x$ and $50b_y$ are the annular harrow tools on the rear gang 32*b*, which are the nearest transverse neighbors to the given annular harrow tool 50*a* on the front gang 32*a*. When the front and rear gangs 32*a*, 32*b*, respectively, are rotated so that the annular harrow tools 50 are in the least aggressive tillage position as seen in FIG. 15A, the first transverse offset distance x is the same as or nearly the same as the second transverse offset distance y, which means that the annular harrow tools 50 are creating longitudinal cutting paths that are equidistantly, or nearly equidistantly, transversely spaced. As the front and rear gangs 32*a*, 32*b*, respectively, are rotated so that the annular harrow tools 50 are in progressively more aggressive tillage positions (see FIG. 15B and then FIG. 15C), the difference between the first transverse offset distance x and the second transverse offset distance y changes, indicating that the points at which the rotating circumferential cutting edges of the annular harrow tools of the front and rear gangs contact the field are shifting transversely relative to each other. This shifting permits the annular harrow tools 50*a* of the front gang 32*a* to throw soil back to the annular harrow tools 50*b* of the rear gang 32*b* for more efficient and effective tilling. Further, as previously mentioned, rotating the front and rear gangs 32*a*, 32*b*, respectively, so that the annular harrow tools 50 are in more aggressive tillage positions increases the longitudinal separation of the gangs 32*a*, 32*b* at the closest separation of the gangs 32*a*, 32*b*, which provides maximum soil flow and helps prevent plugging of the implement.

Figure 16:
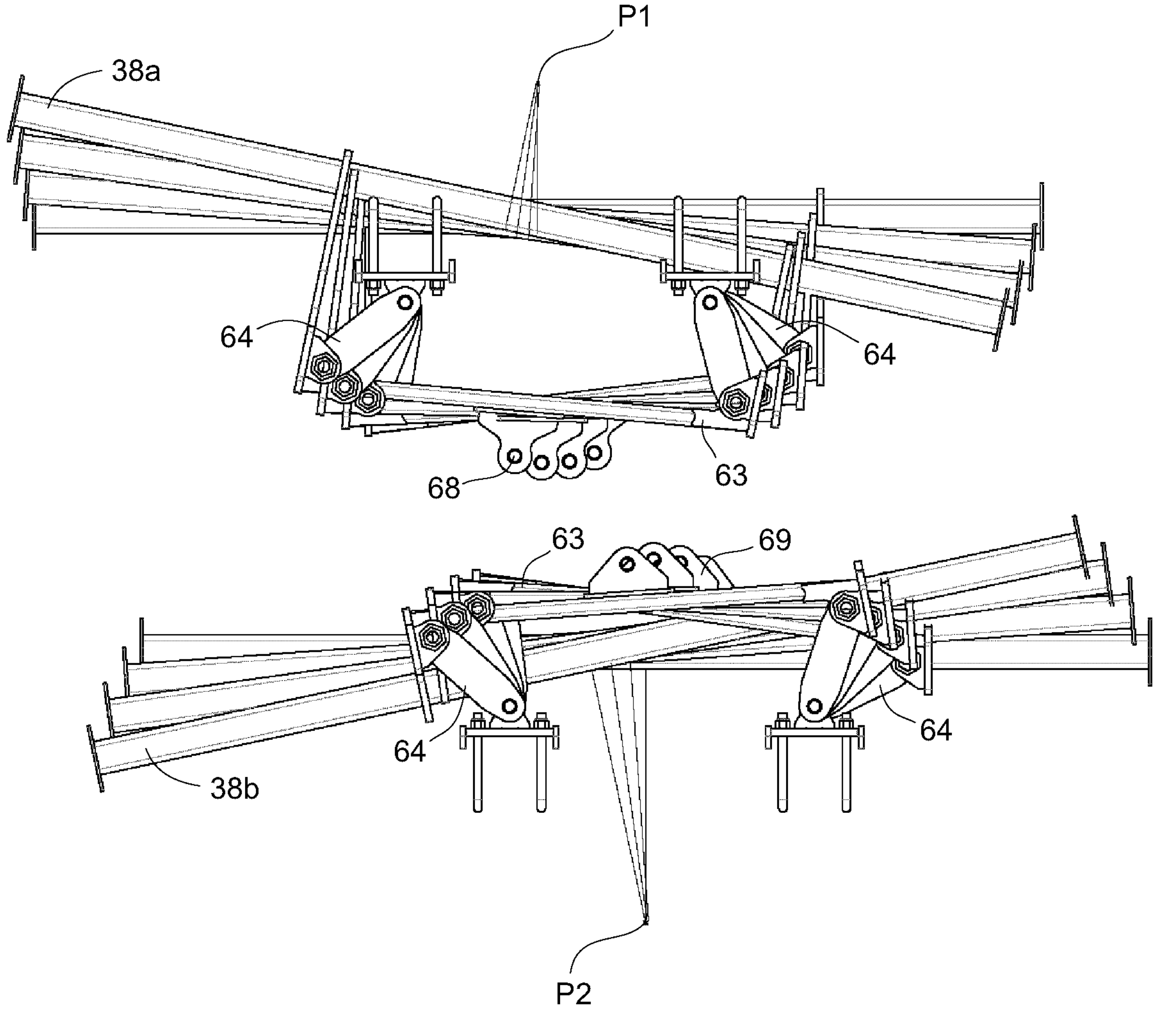
FIG. 16 depicts the locations in space of virtual vertical rotation axes of toolbars of the front and rear gangs show in FIG. 15A to FIG. 15C when the toolbars are rotated.

When the double link linkage mechanism 60 is used to rotate the toolbars, the toolbars rotate about virtual rotation axes. Virtual rotation axes are axes in space that do not pass through any real pivot points of the linkages themselves. FIG. 16 depicts the location in space of virtual vertical rotation axes P1 and P2 of the toolbars 38*a* and 38*b*, respectively, as the toolbars 38*a* and 38*b* are rotated in opposite rotation directions by the double link linkage mechanism 60. FIG. 16 is a top view with the forward direction being toward the top of the Figure. FIG. 16 shows that the virtual rotation axis P1 of the front toolbar 38*a* is forward of the front toolbar 38*a*, and that the pivot point 68 where the side linkage arm 63 is connected to the control rod (not shown in FIG. 16) translates transversely as the front toolbar 38*a* is rotated about the rotation axis P1. Similarly, the virtual rotation axes P2 of the rear toolbar 38*b* is rearward of the rear toolbar 38*b*, and the pivot point 69 where the side linkage arm 63 is connected to the control rod (not shown in FIG. 16) translates transversely as the rear toolbar 38*b* is rotated about the rotation axis P2.

Figure 17A:
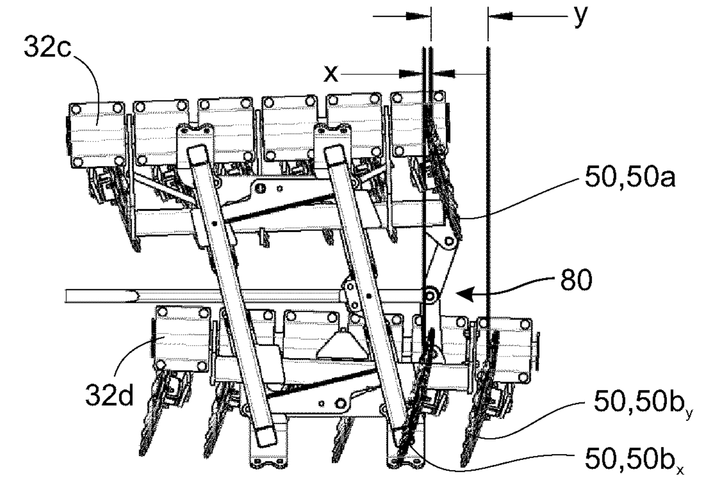
FIG. 17A, FIG. 17B and FIG. 17C depicts top views of front and rear gangs of annular harrow tools connected by the center pivot linkage mechanism shown in FIG. 11 illustrating how the gangs pivot about a real pivot point as the gangs are simultaneously rotated by the linkage mechanism to rotate the annular harrow tools through an angle of 14° with respect to a longitudinal axis of the tillage implement.
Figure 17B:
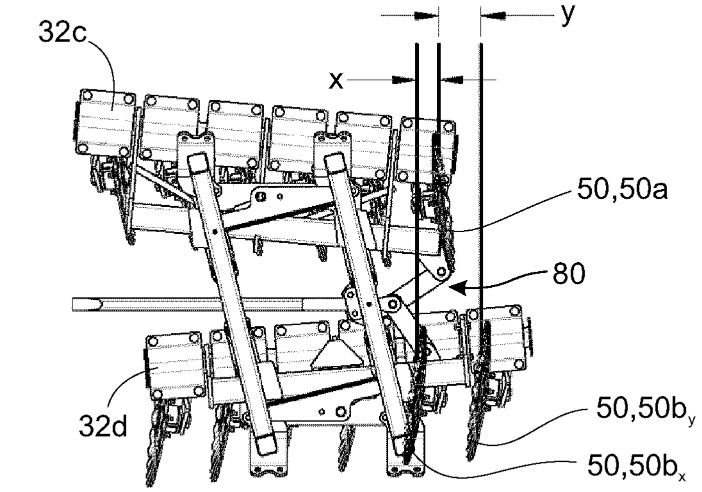
Figure 17C:
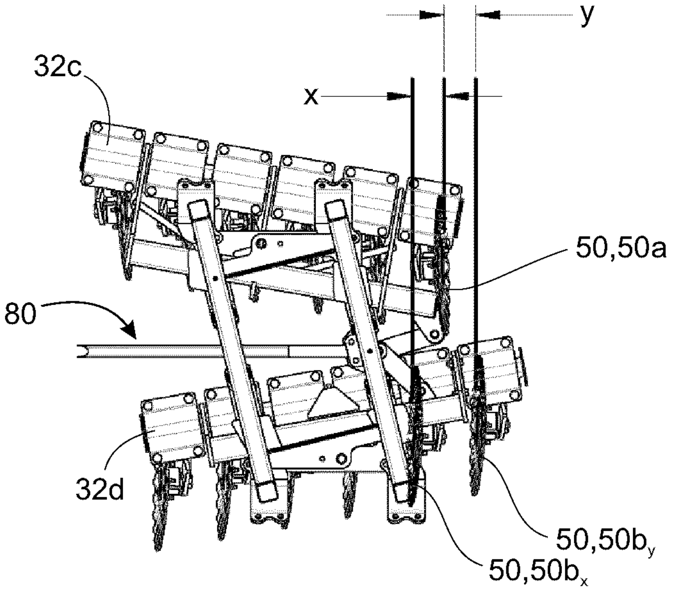

FIG. 17, FIG. 17B and FIG. 17C illustrate how simultaneously rotating the front and rear gangs 32*c*, 32*d*, respectively, in opposite rotational directions about their respective vertical rotation axes using the center pivot linkage mechanism 80 causes shifting of the relative transverse positions of the points at which rotating circumferential cutting edges of the annular harrow tools 50*a* (only one labeled) of the front gang 32*a* contact the field and the points at which the rotating circumferential cutting edges of the annular harrow tools 50*b* (only two labeled) of the rear gang 32*b* contact the field. FIG. 17A shows the annular harrow tools 50 in a less aggressive tillage position, with the aggressiveness of the tillage position of the annular harrow tools 50 increasing through FIG. 17B to FIG. 17C. The same analysis as for FIG. 15A, FIG. 15B and FIG. 15C applies to FIG. 17, FIG. 17B and FIG. 17C showing that the two different linkage mechanisms 60, 80 can be utilized to achieve similar results.

Figure 18A:
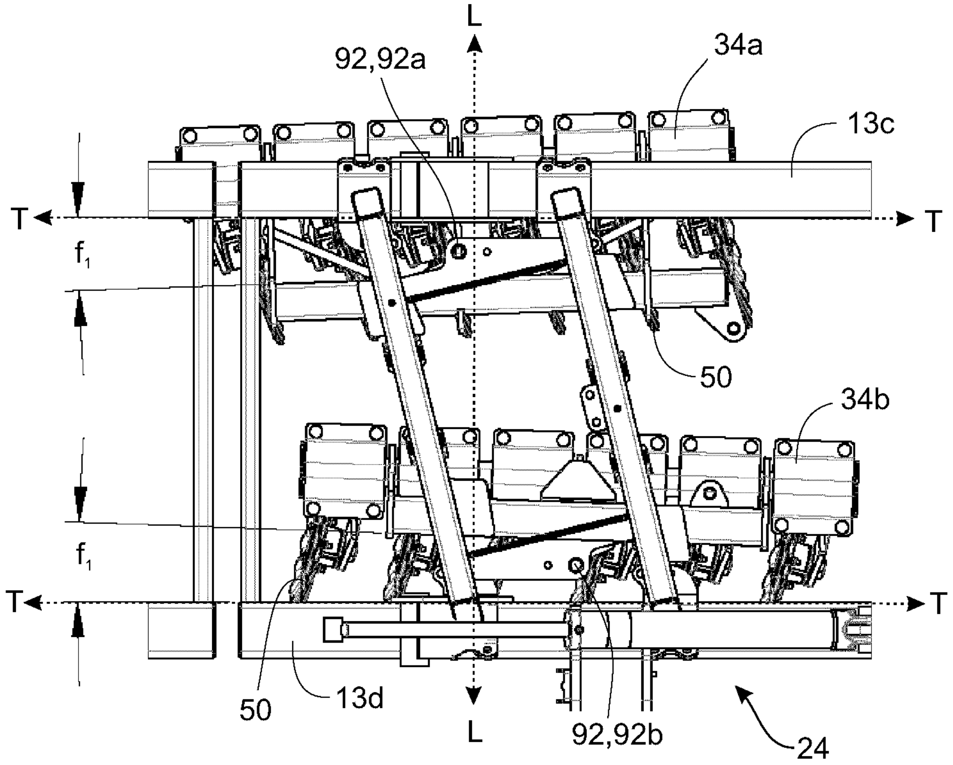
FIG. 18A and FIG. 18B depict top views of front and rear gangs of annular harrow tools illustrating that when toolbars of the gangs are parallel or close to parallel with a transverse axis of the tillage implement (FIG. 18A), the annular harrow tools are in an aggressive tillage position angled away from a longitudinal axis of the tillage implement, while when the annular harrow tools are in a least aggressive tillage position parallel to the longitudinal axis (FIG. 18B), the toolbars are angled away from the transverse axis of the tillage implement.
Figure 18B:
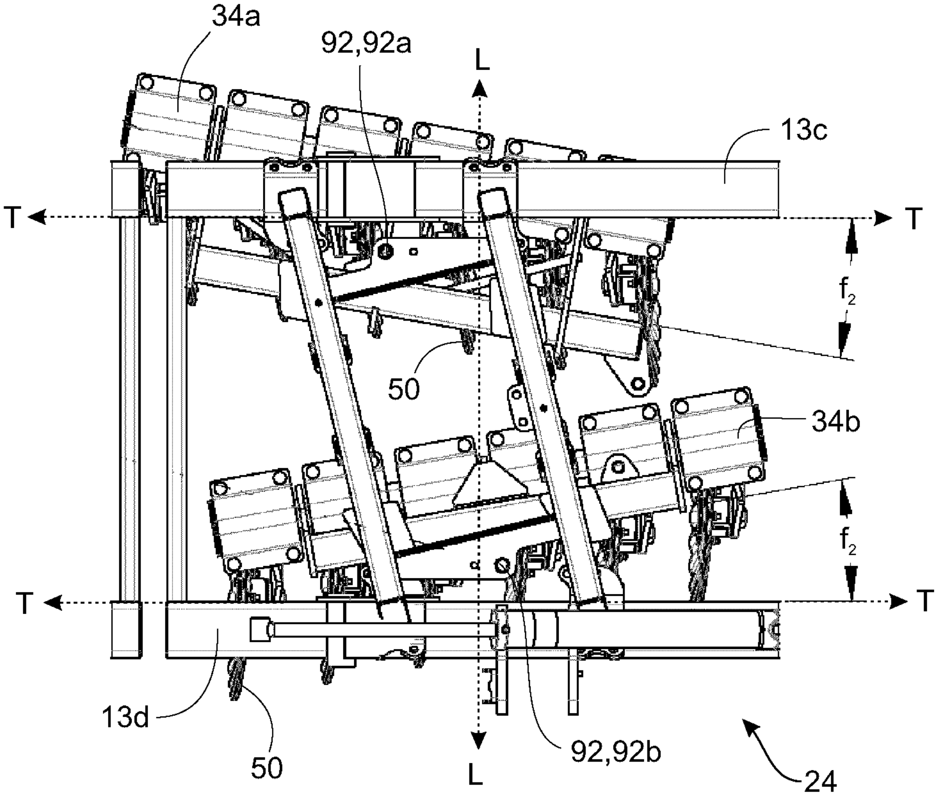

FIG. 18A and FIG. 18B illustrate front and rear gangs 34*a*, 34*b*, respectively on the second wing section 24, where rotation of the gangs 34*a*, 34*b* is controlled by a center pivot linkage mechanism (not shown). Through operation of the center pivot linkage mechanism, the gangs 34*a*, 34*b* rotate in opposite rotational directions about vertical rotation axes through real pivot points 92, with the front gang 34*a* rotating about front pivot point 92*a* and the rear gang 34*b* rotating about rear pivot point 92*b*. When the gangs 34*a*, 34*b* are parallel or close to parallel (angle $f_1$) with the transverse axis T-T of the tillage implement (FIG. 18A), the annular harrow tools 50 (only one labeled on each gang) are in an aggressive tillage position angled away from the longitudinal axis L-L of the tillage implement, while when the annular harrow tools 50 are in a least aggressive tillage position parallel to the longitudinal axis L-L (FIG. 18B), the gangs 34*a*, 34*b* are angled away (angle $f_2$) from the transverse axis T-T.

Figure 18C:
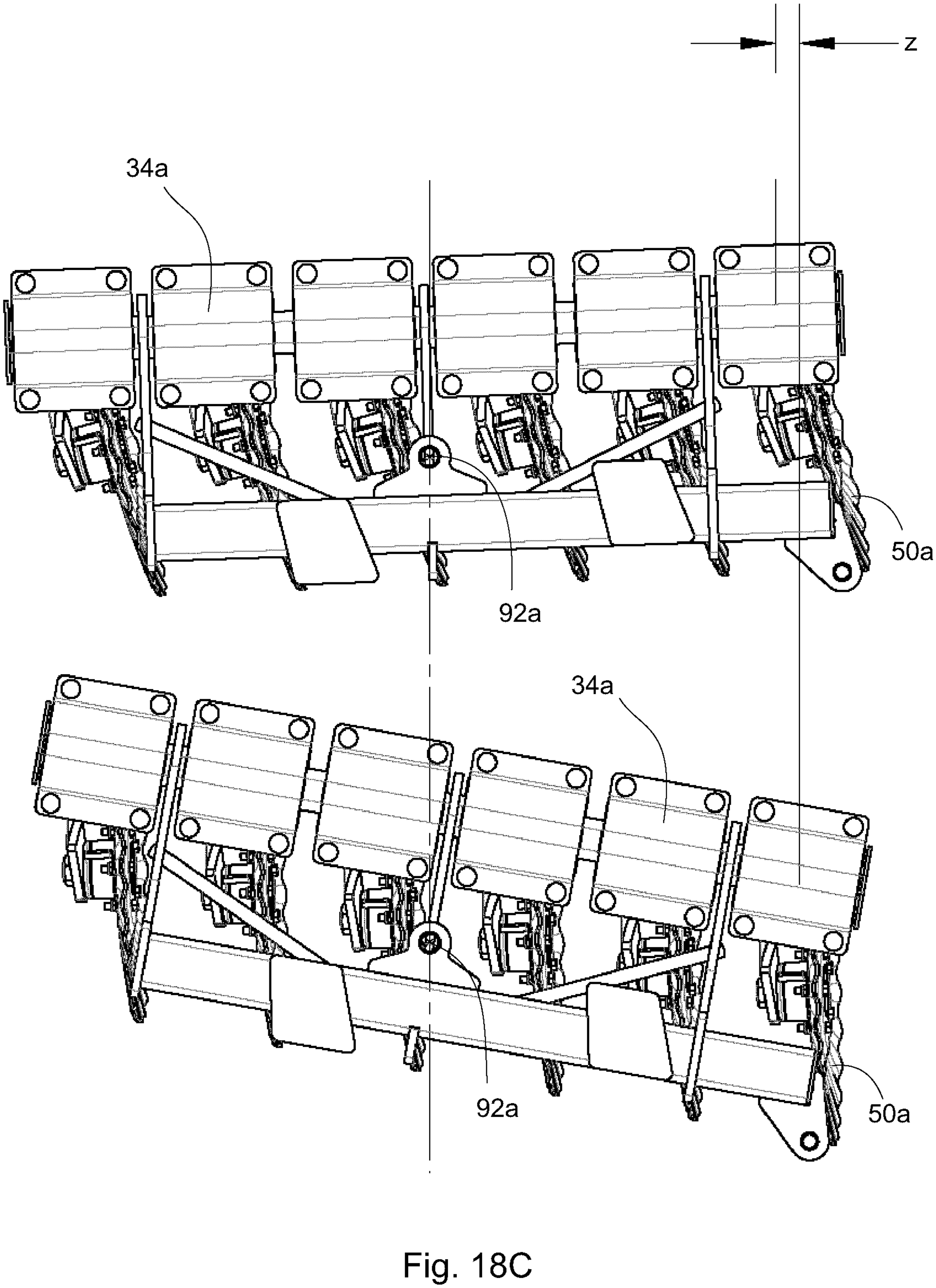
FIG. 18C depicts a single gang of annular harrow tools shown in an aggressive tillage position (upper) and a non-aggressive tillage position (lower) illustrating how relative transverse positions of points at which the cutting edges of the annular harrow tools first contact the field shift transversely when the toolbar is rotated between the aggressive tillage position (upper) and the non-aggressive tillage position (lower).

FIG. 18C shows the front gang 34*a* from FIG. 18A and FIG. 18B with the annular harrow tools 50*a* (only one labeled) shown in an aggressive tillage position (upper) and a non-aggressive tillage position (lower) illustrating how relative transverse positions of points at which the cutting edges of the annular harrow tools 50*a* first contact the field shift transversely by an amount z when the gang 34*a* is rotated 12° between the aggressive tillage position (upper) and the non-aggressive tillage position (lower). The real pivot point 92*a* through which the vertical rotation axis passed does not shift transversely when the gang 34*a* is rotated about the vertical rotation axis.

Figure 19A:
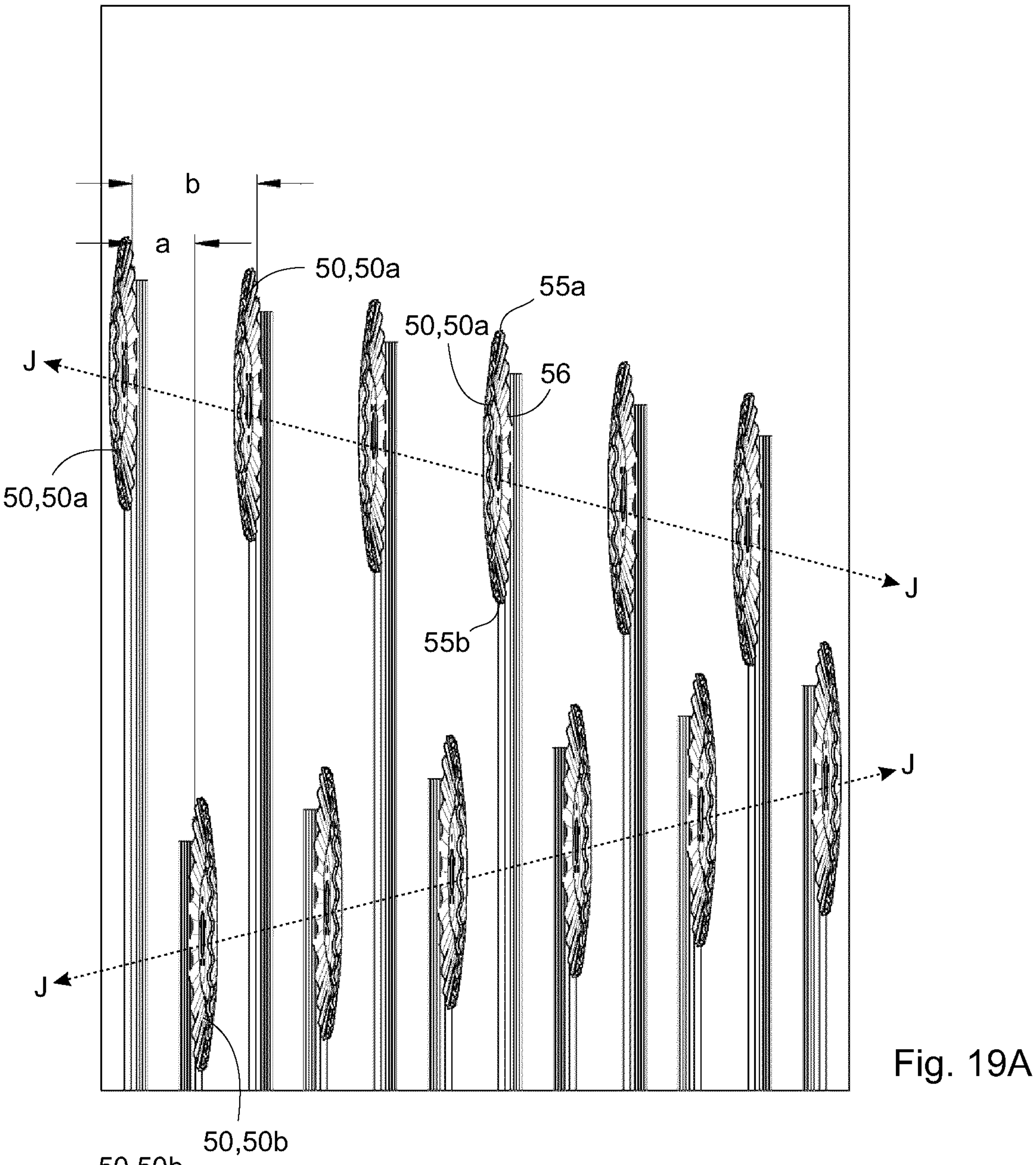
FIG. 19A depicts a top view of how annular harrow tools in front and rear gangs are arranged when the annular harrow tools are in a least aggressive tillage position and toolbars of the gangs are angled away from a transverse axis of the tillage implement.
Figure 19B:
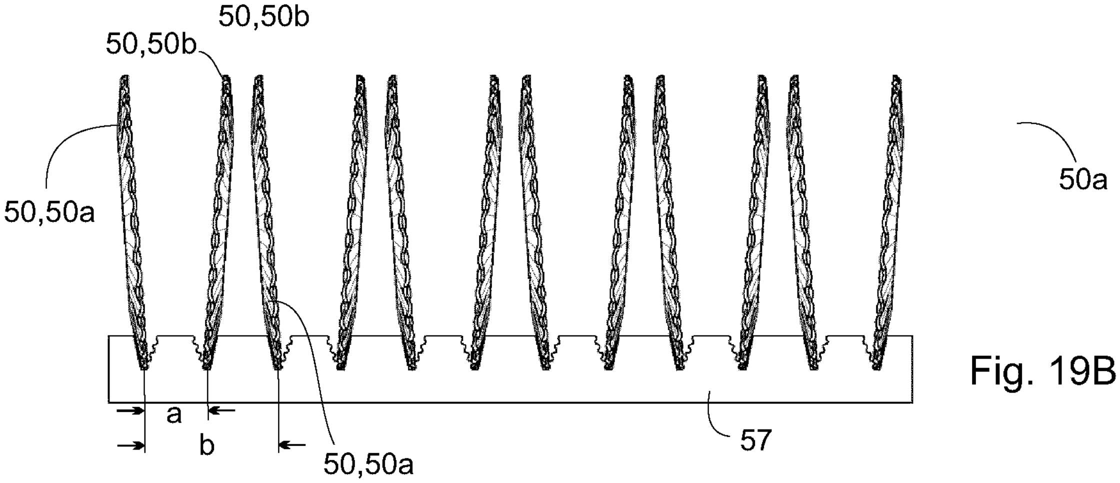
FIG. 19B depicts a front view of the FIG. 19A.

FIG. 19A and FIG. 19B depict how annular harrow tools 50*a* (only three labeled) in front gangs and annular harrow tools 50*b* (only one labeled) in rear gangs are arranged when the annular harrow tools 50 are in a least aggressive tillage position and the vertical toolbar planes J-J of the gangs are angled away from the transverse axis of the tillage implement. In the least aggressive tillage position, diametrically opposed points 55*a*, 55*b* (only one each labeled) on the circumferential cutting edge 56 (only one labeled) of the annular harrow tools 50 define a vertical harrow tool plane that is parallel to the longitudinal axis of the implement, which is parallel to the direction of motion of the implement. Soil disturbance when the annular harrow tools 50 are in the least aggressive tillage position is shown in FIG. 19B, which shows that in the least aggressive position, the annular harrow tools 50 slice to reduce size of residue in soil 57, but provide minimal tillage. Further, a transverse distance b between the cutting points of adjacent annular harrow tools 50 on the same gang is the same from tool-to-tool, and a transverse distance a between the cutting points of adjacent annular harrow tools 50 on different gangs is about half of the distance b, which results in cutting lines that transversely essentially equidistant apart by the distance a. Further, longitudinal separation between the vertical toolbar planes J-J of the front and rear gangs is small at one end of the gangs and large at the other end. The small longitudinal separation at the one end does not affect performance because the annular harrow tools 50 only minimally till the soil 57 so large amounts of soil flow through the implement are not required and no plugging at the end with smaller separation of the gangs will occur.

Figure 20A:
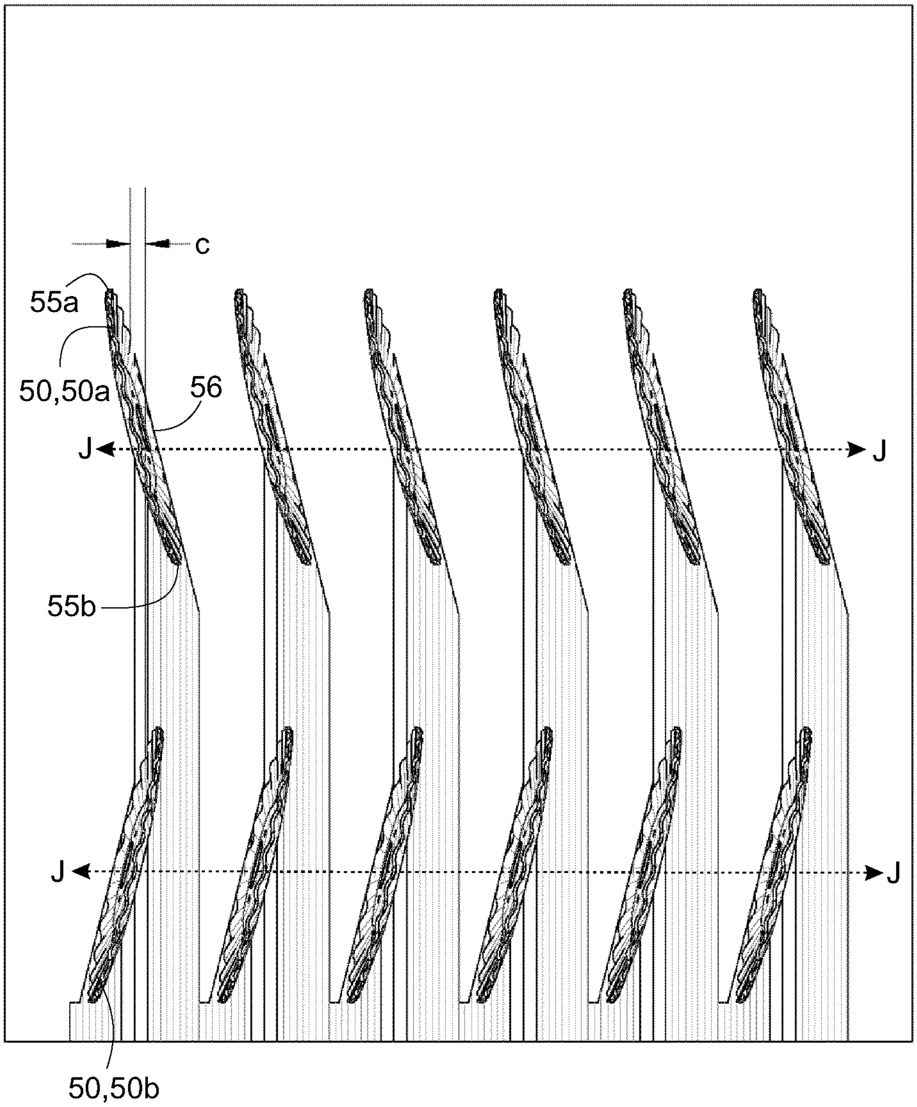
FIG. 20A depicts a top view of how annular harrow tools in front and rear gangs are arranged when the annular harrow tools are in a most aggressive tillage position and toolbars of the gangs are parallel or almost parallel with a transverse axis of the tillage implement.
Figure 20B:
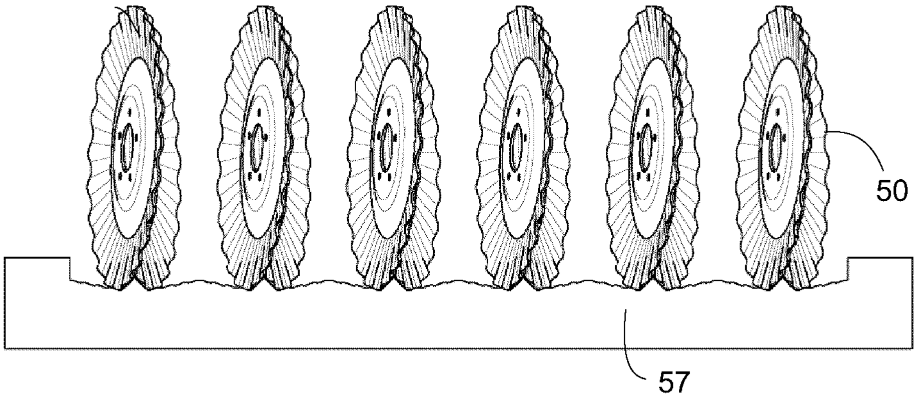
FIG. 20B depicts a front view of the FIG. 20A.

FIG. 20A and FIG. 20B depict how annular harrow tools 50*a* (only one labeled) in the front gangs and annular harrow tools 50*b* (only one labeled) in rear gangs are arranged when the annular harrow tools 50 are in a most aggressive tillage position and the vertical toolbar planes J-J of the gangs are parallel or almost parallel with the transverse axis of the tillage implement. In the least aggressive tillage position, diametrically opposed points 55*a*, 55*b* (only one each labeled) on the circumferential cutting edge 56 (only one labeled) of the annular harrow tools 50 define a vertical harrow tool plane that is angled away from the longitudinal axis of the implement. Soil disturbance when the annular harrow tools 50 are in the most aggressive tillage position is shown in FIG. 20B, which shows that in the most aggressive position, the annular harrow tools 50 create full shear across the soil 57 fully disturbing the soil 57 for maximum tillage. Further a transverse distance c between the cutting points of adjacent annular harrow tools 50 on different gangs is small, while the transverse distance between the cutting points of adjacent annular harrow tools 50 on the same gang is large. Furthermore, longitudinal separation between the vertical toolbar planes J-J of the front and rear gangs is the same along the lengths of the gangs, and is large enough to permit the highly tilled soil 57 to flow through the implement without plugging the implement.

Figure 21A:
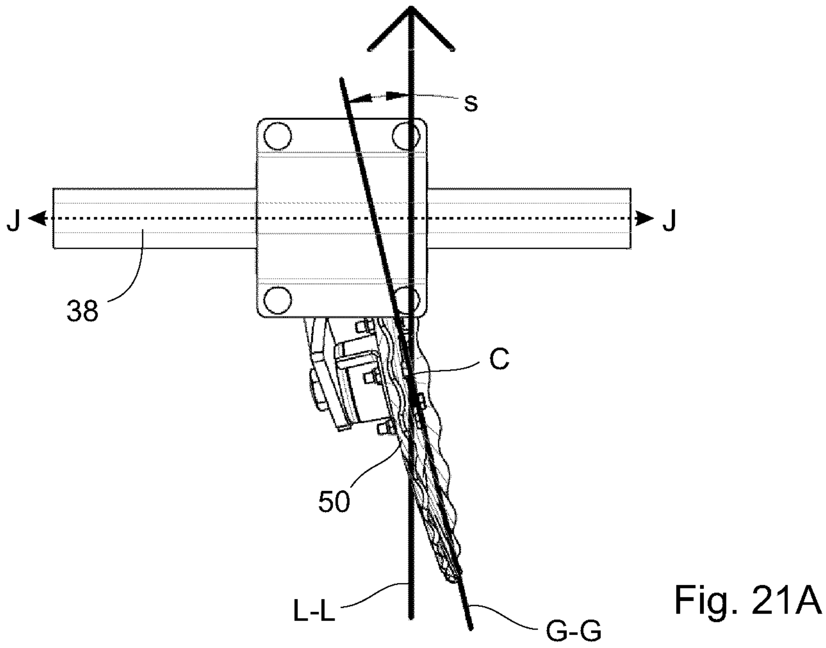
FIG. 21A depicts a top view of a compound angle annular harrow tool mounted on a toolbar.
Figure 21B:
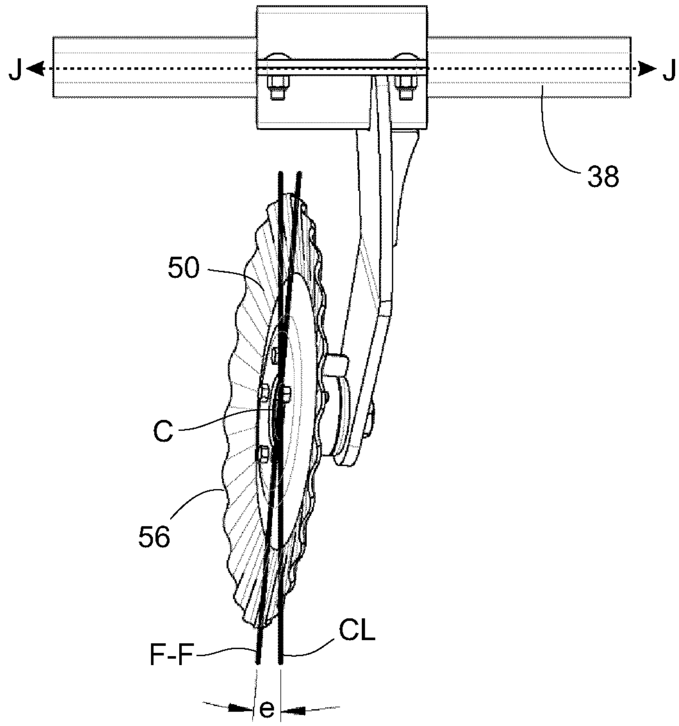
FIG. 21B depicts a front view of FIG. 21A.
Figure 22A:
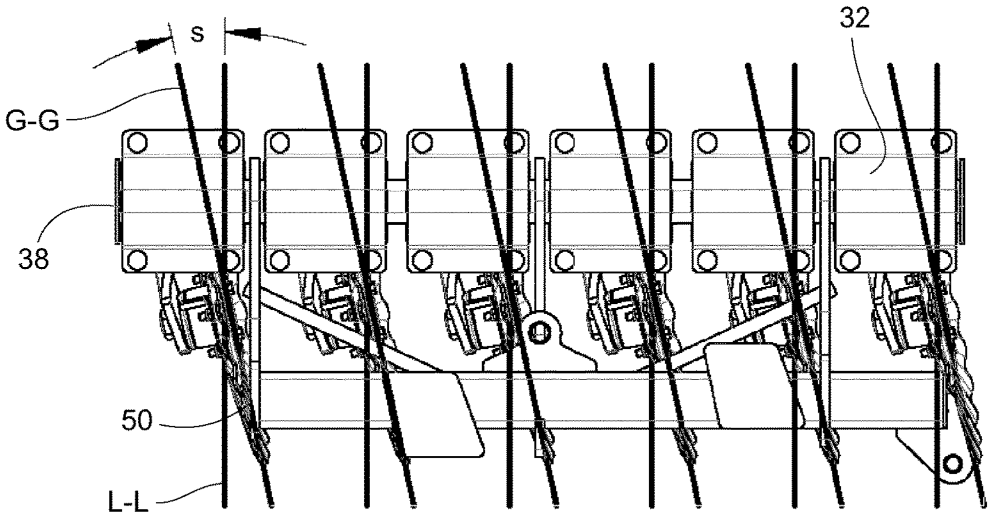
FIG. 22A depicts a top view of a front gang of compound angle annular harrow tools showing the angle the compound angle harrow tools make with respect to a longitudinal axis of the tillage implement.
Figure 22B:
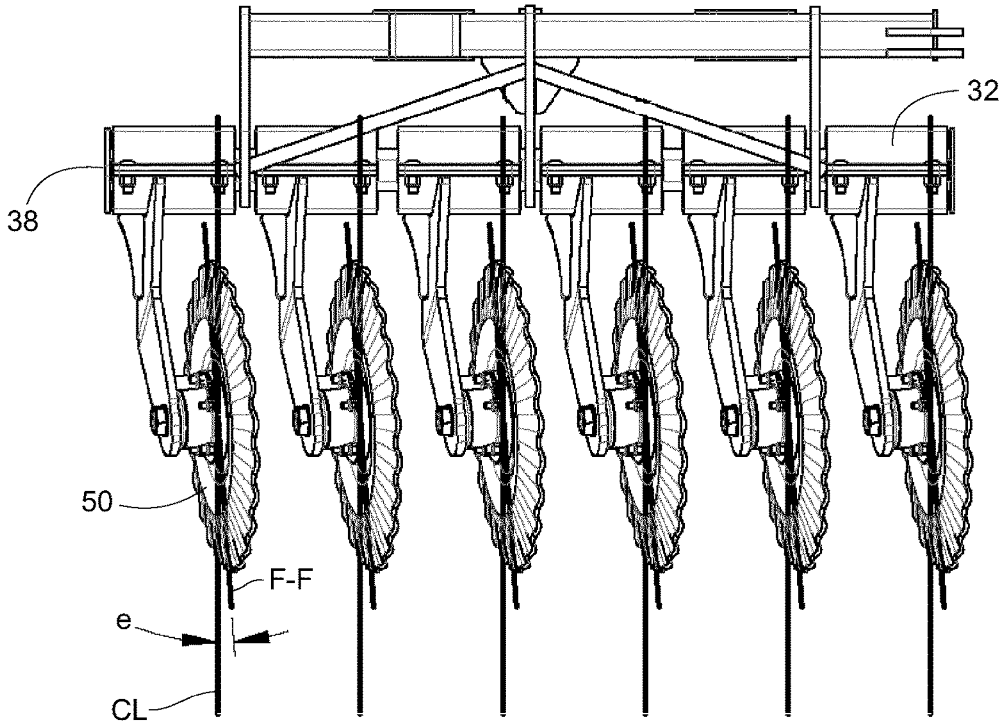
FIG. 22B depicts a rear view of the front gang shown in FIG. 22A showing the angle the compound angle harrow tools make with respect to a vertical axis of the tillage implement

FIG. 21A, FIG. 21B, FIG. 22A and FIG. 22B illustrate annular harrow tools 50 mounted at compound angles on a toolbar 38 illustrating that the gangs may be arranged similarly using annular harrow tools 50 mounted at compound angles. FIG. 21A and FIG. 21B depicts a single angle annular harrow tool 50 mounted on the toolbar 38 at compound angles where angle s is an angle relation between a vertical plane G-G through a center C of the annular harrow tool 50 and the direction of travel of the implement (i.e. the longitudinal axis L-L), and angle e is an angle relation between a vertical axis CL through the center C of the annular harrow tool 50 and a face plane of the annular harrow tool 50 defined by the cutting edge 56. With an annular harrow tool mounted at compound angles, the face plane of the annular harrow tool is non-parallel to the horizontal plane and both vertical planes as defined by the ground. FIG. 22A and FIG. 22B depict a gang 32 of annular harrow tools 50 (only one labeled) mounted on the toolbar 38 illustrating the angle s (only one labeled) that the compound angle mounted annular harrow tools 50 make with respect to the longitudinal axis L-L of the tillage implement (FIG. 22A), and illustrating the angle e that the compound angle mounted harrow tools 50 make with respect to the vertical axis CL of the tillage implement The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A tillage implement comprising:

a frame connectable to a towing vehicle, the frame comprising a plurality of elongated transverse frame elements and a plurality of elongated longitudinal frame elements connected to the plurality of elongated transverse frame elements, the frame having a horizontal longitudinal axis parallel to a direction of travel of the tillage implement and a horizontal transverse axis perpendicular to the horizontal longitudinal axis when the tillage implement is in a deployed configuration to till a field;

a first gang comprising a first toolbar and a first plurality of annular harrow tools mounted on the first toolbar, the first toolbar having a first vertical toolbar plane through a length of the first toolbar, each annular harrow tool of the first plurality of annular harrow tools having a first rotating circumferential cutting edge whereby a first vertical harrow tool plane passes through two diametrically opposed points on the first circumferential cutting edge, the first toolbar pivotally mounted on the frame to be rotatable about a first vertical rotation axis;

a second gang comprising a second toolbar and a second plurality of annular harrow tools mounted on the second toolbar, the second toolbar having a second vertical toolbar plane through a length of the second toolbar, each annular harrow tool of the second plurality of annular harrow tools having a second rotating circumferential cutting edge whereby a second vertical harrow tool plane passes through two diametrically opposed points on the second circumferential cutting edge, the second toolbar pivotally mounted on the frame to be rotatable about a second vertical rotation axis, the second toolbar longitudinally spaced from the first toolbar;

a linkage mechanism disposed longitudinally between the first and second toolbars, the linkage mechanism comprising a plurality of pivotally connected linkage arms, the first and second toolbars each pivotally connected to the linkage mechanism, operation of the linkage mechanism simultaneously rotating the first toolbar about the first vertical rotation axis and rotating the second toolbar about the second vertical rotation axis in an opposite rotational direction as the first toolbar; and, at least one wheel for supporting the frame on the field, the at least one wheel mounted on the frame longitudinally forward of both the first and second gang or longitudinally rearward of both the first and second gang, wherein the first and second pluralities of annular harrow tools are in a least aggressive tillage position when the first and second vertical harrow tool planes are parallel to the longitudinal axis, wherein the first and second vertical tool bar planes are angled away further away from the transverse axis of the tillage implement when the first and second pluralities of annular harrow tools are moved into the least aggressive tillage position.

2. The implement of claim 1, further comprising an actuator mounted on the frame and connected to at least one of the linkage arms of the linkage mechanism, wherein operation of the actuator operates the linkage mechanism and the actuator is controlled from the towing vehicle towing the implement.

3. The implement of claim 2, wherein the actuator comprises a hydraulic cylinder or a linear actuator.

4. The implement of claim 2, wherein:

the first gang comprises a first gang assembly comprising the first toolbar, a first support bar opposed to the first toolbar and at least two first support brackets rigidly connecting the first toolbar to the first support bar;

the second gang comprises a second gang assembly comprising the second toolbar, a second support bar opposed to the second toolbar and at least two second support brackets rigidly connecting the second toolbar to the second support bar;

the plurality of linkage arms comprises a transversely oriented common control rod pivotally connected to the first and second gangs through at least two connecting arms pivotally mounted on the control rod; and, the actuator is pivotally connected to the control rod whereby actuation of the actuator causes the first and second toolbars to rotate in opposite rotational directions about the first and second vertical rotation axes, respectively.

5. The implement of claim 4, wherein:

the actuator is pivotally attached to the first support bar and the control rod at a common location;

the at least two connecting arms comprises one connecting arm pivotally connected to the control rod and the second support bar; and, the first and second gang assemblies each comprise at least two gang assembly linkage arms, each of the gang assembly arms pivotally connected to the first support bar and at least one of the transverse frame elements.

6. The implement of claim 4, wherein:

the at least two connecting arms comprises two connecting arms, one of the connecting arms pivotally connected to the control rod and the first support bar and one of the connecting arms pivotally connected to the control rod and the second support bar, the two connecting arms pivotally connected to the control rod at a common location; and, the first and second support bars are each rotatably connected to the transverse frame elements at first and second pivot points, respectively, through which the first and second vertical rotation axes pass, respectively.

7. The implement of claim 4, wherein the plurality of linkage arms comprises a bell crank control linkage.

8. The implement of claim 1, wherein the at least one wheel comprises a plurality of wheels mounted longitudinally forward of both the first and second gang.

9. The implement of claim 1, wherein:

the first vertical harrow tool planes are parallel to and transversely offset equidistantly or nearly equidistantly from adjacent second vertical harrow tool planes when the first and second pluralities of annular harrow tools are in the least aggressive tillage position; and, relative transverse positions of points at which the rotating circumferential cutting edges of the first and second pluralities of annular harrow tools first contact the field shift transversely to provide the equidistant or nearly equidistant transverse offset when the first and second gangs are rotated so that the first and second pluralities of annular harrow tools are in the least aggressive tillage position.

10. The implement of claim 1, wherein each of the first and second gangs are rotatable through an angle of 16°.

11. The implement of claim 1, wherein when the first and second gangs each form an angle of 0° with respect to the horizontal transverse axis, the first vertical harrow tool plane forms an angle in a range of from 0° to 16° with respect to the horizontal longitudinal axis and the second vertical harrow tool plane forms an angle in a range of from 0° to −16° with respect to the horizontal longitudinal axis.

12. The implement of claim 1, wherein when the first and second gangs each form an angle of 0° with respect to the horizontal transverse axis, the first vertical harrow tool plane forms an angle in a range of from 8° to 16° with respect to the horizontal longitudinal axis and the second vertical harrow tool plane forms an angle in a range of from −8° to −16° with respect to the horizontal longitudinal axis.

13. The implement of claim 1, wherein: the first vertical harrow tool plane forms an angle in a range of from 0° to 16° with respect to a first line normal to the first vertical toolbar plane; and, the second vertical harrow tool plane forms an angle in a range of from 0° to 16° with respect to a second line normal to the second vertical toolbar plane.

14. The implement of claim 1, wherein: the first vertical harrow tool plane forms an angle in a range of from 8° to 16° with respect to a first line normal to the first vertical toolbar plane; and, the second vertical harrow tool plane forms an angle in a range of from 8° to 16° with respect to a second line normal to the second vertical toolbar plane.

15. The implement of claim 1, wherein the frame comprises a wing section on which the first and second gangs are mounted and a wing support, wherein the wing section is pivotally mounted on the wing support and the wing support is pivotally mounted on the frame such that the wing section and the wing support are pivotable between the deployed configuration where the wing section is horizontally oriented and the first and second gangs are oriented transversely to the longitudinal axis and a stowed position where the wing section is vertically oriented and the first and second gangs are oriented parallel to the longitudinal axis.

16. The implement of claim 15, wherein the wing section further comprises a third gang and a fourth gang substantially identical to the first gang and the second gang, respectively, and transversely spaced-apart from the first and second gangs, the third and fourth gangs connected to the linkage mechanism, the linkage mechanism disposed longitudinally between the third and fourth gangs.

17. The implement of claim 15, wherein the wing support is a center section of the frame, the wing section is a first wing section pivotally mounted on a first side of the center section, and wherein the frame further comprises a second wing section substantially identical to the first wing section, the second wing section pivotally mounted on the center section on a second side transversely opposite the first side.

18. A tillage implement comprising:

a frame connectable to a towing vehicle, the frame comprising a plurality of elongated transverse frame elements and a plurality of elongated longitudinal frame elements connected to the plurality of elongated transverse frame elements, the frame having a horizontal longitudinal axis parallel to a direction of travel of the tillage implement and a horizontal transverse axis perpendicular to the horizontal longitudinal axis when the tillage implement is in a deployed configuration to till a field;

a first gang comprising a first toolbar and a first plurality of annular harrow tools mounted on the first toolbar, the first toolbar having a first vertical toolbar plane through a length of the first toolbar, each annular harrow tool of the first plurality of annular harrow tools having a first rotating circumferential cutting edge whereby a first vertical harrow tool plane passes through two diametrically opposed points on the first circumferential cutting edge, the first toolbar pivotally mounted on the frame to be rotatable about a first vertical rotation axis;

a second gang comprising a second toolbar and a second plurality of annular harrow tools mounted on the second toolbar, the second toolbar having a second vertical toolbar plane through a length of the second toolbar, each annular harrow tool of the second plurality of annular harrow tools having a second rotating circumferential cutting edge whereby a second vertical harrow tool plane passes through two diametrically opposed points on the second circumferential cutting edge, the second toolbar pivotally mounted on the frame to be rotatable about a second vertical rotation axis, the second toolbar longitudinally spaced from the first toolbar;

a linkage mechanism disposed longitudinally between the first and second toolbars, the linkage mechanism comprising a plurality of pivotally connected linkage arms, the first and second toolbars each pivotally connected to the linkage mechanism, operation of the linkage mechanism simultaneously rotating the first toolbar about the first vertical rotation axis and rotating the second toolbar about the second vertical rotation axis in an opposite rotational direction as the first toolbar;

an actuator mounted on the frame and connected to at least one of the linkage arms of the linkage mechanism, wherein operation of the actuator operates the linkage mechanism and the actuator is controlled from the towing vehicle towing the implement; and, at least one wheel for supporting the frame on the field, the at least one wheel mounted on the frame longitudinally forward of both the first and second gang or longitudinally rearward of both the first and second gang, wherein:

the first gang comprises a first gang assembly comprising the first toolbar, a first support bar opposed to the first toolbar and at least two first support brackets rigidly connecting the first toolbar to the first support bar;

the second gang comprises a second gang assembly comprising the second toolbar, a second support bar opposed to the second toolbar and at least two second support brackets rigidly connecting the second toolbar to the second support bar;

the plurality of linkage arms comprises a transversely oriented common control rod pivotally connected to the first and second gangs through at least two connecting arms pivotally mounted on the control rod; and, the actuator is pivotally connected to the control rod whereby actuation of the actuator causes the first and second toolbars to rotate in opposite rotational directions about the first and second vertical rotation axes, respectively.

19. A tillage implement comprising:

a frame connectable to a towing vehicle, the frame comprising a plurality of elongated transverse frame elements and a plurality of elongated longitudinal frame elements connected to the plurality of elongated transverse frame elements, the frame having a horizontal longitudinal axis parallel to a direction of travel of the tillage implement and a horizontal transverse axis perpendicular to the horizontal longitudinal axis when the tillage implement is in a deployed configuration to till a field;

a first gang comprising a first toolbar and a first plurality of annular harrow tools mounted on the first toolbar, the first toolbar having a first vertical toolbar plane through a length of the first toolbar, each annular harrow tool of the first plurality of annular harrow tools having a first rotating circumferential cutting edge whereby a first vertical harrow tool plane passes through two diametrically opposed points on the first circumferential cutting edge, the first toolbar pivotally mounted on the frame to be rotatable about a first vertical rotation axis;

a second gang comprising a second toolbar and a second plurality of annular harrow tools mounted on the second toolbar, the second toolbar having a second vertical toolbar plane through a length of the second toolbar, each annular harrow tool of the second plurality of annular harrow tools having a second rotating circumferential cutting edge whereby a second vertical harrow tool plane passes through two diametrically opposed points on the second circumferential cutting edge, the second toolbar pivotally mounted on the frame to be rotatable about a second vertical rotation axis, the second toolbar longitudinally spaced from the first toolbar;

a linkage mechanism disposed longitudinally between the first and second toolbars, the linkage mechanism comprising a plurality of pivotally connected linkage arms, the first and second toolbars each pivotally connected to the linkage mechanism, operation of the linkage mechanism simultaneously rotating the first toolbar about the first vertical rotation axis and rotating the second toolbar about the second vertical rotation axis in an opposite rotational direction as the first toolbar; and, at least one wheel for supporting the frame on the field, the at least one wheel mounted on the frame longitudinally forward of both the first and second gang or longitudinally rearward of both the first and second gang, wherein:

when the first and second gangs each form an angle of 0° with respect to the horizontal transverse axis, the first vertical harrow tool plane forms an angle in a range of from 8° to 16° with respect to the horizontal longitudinal axis and the second vertical harrow tool plane forms an angle in a range of from −8° to −16° with respect to the horizontal longitudinal axis; or, the first vertical harrow tool plane forms an angle in a range of from 8° to 16° with respect to a first line normal to the first vertical toolbar plane; and, the second vertical harrow tool plane forms an angle in a range of from 8° to 16° with respect to a second line normal to the second vertical toolbar plane.

* * * * *